(12) United States Patent
Du

(10) Patent No.: US 10,657,690 B2
(45) Date of Patent: May 19, 2020

(54) INTELLIGENT AUGMENTED REALITY (IAR) PLATFORM-BASED COMMUNICATION SYSTEM

(71) Applicant: INTEGEM INC., Cupertino, CA (US)

(72) Inventor: Eliza Y. Du, Cupertino, CA (US)

(*) Notice: Subject to any disclaimer, the term of this patent is extended or adjusted under 35 U.S.C. 154(b) by 54 days.

(21) Appl. No.: 15/675,635

(22) Filed: Aug. 11, 2017

(65) Prior Publication Data

US 2018/0047196 A1 Feb. 15, 2018

Related U.S. Application Data

(63) Continuation-in-part of application No. 15/367,124, filed on Dec. 1, 2016, and a continuation-in-part of application No. 15/479,269, filed on Apr. 4, 2017, and a continuation-in-part of application No. 15/479,277, filed on Apr. 4, 2017, and a continuation-in-part of application No. 15/665,295, filed on Jul. 31, 2017, now Pat. No. 10,162,308.

(60) Provisional application No. 62/373,822, filed on Aug. 11, 2016.

(51) Int. Cl.
| | |
|---|---|
| G09G 5/00 | (2006.01) |
| G06T 11/60 | (2006.01) |
| G06T 19/00 | (2011.01) |
| G06N 5/02 | (2006.01) |
| H04N 7/15 | (2006.01) |
| H04N 7/14 | (2006.01) |
| G06F 21/62 | (2013.01) |
| G06F 16/9535 | (2019.01) |
| H04L 29/06 | (2006.01) |

(52) U.S. Cl.
CPC .......... *G06T 11/60* (2013.01); *G06F 16/9535* (2019.01); *G06F 21/6209* (2013.01); *G06N 5/02* (2013.01); *G06T 19/006* (2013.01); *H04N 7/147* (2013.01); *H04N 7/157* (2013.01); *H04L 63/0428* (2013.01)

(58) Field of Classification Search
CPC ........ G06T 19/006; G06T 19/00; H04N 21/43
See application file for complete search history.

(56) References Cited

U.S. PATENT DOCUMENTS

| | | | | |
|---|---|---|---|---|
| 2012/0306920 A1* | 12/2012 | Bathiche | ................. | A63F 13/10 345/633 |
| 2012/0327119 A1* | 12/2012 | Woo | .................. | G06F 17/30029 345/633 |
| 2017/0285736 A1* | 10/2017 | Young | ..................... | G06F 3/013 |
| 2017/0351417 A1* | 12/2017 | Manico | .................. | G06N 5/022 |

* cited by examiner

*Primary Examiner* — Weiming He

(57) ABSTRACT

Systems, devices and methods for an intelligent augmented reality (IAR) platform-based communications are disclosed. During a communication, real-time audio, video and/or sensor data are captured in real-time; and scene analysis and data analytics are also performed in real-time to extract information from raw data. The extracted information can be further analyzed to provide knowledge. Real-time AR data can be generated by integrating the raw data, AR input data, information input, and knowledge input, based on one or more criteria comprising a user preference, a system setting, an integration parameter, a characteristic of an object or a scene of the raw data, an interactive user control, or a combination thereof. In some embodiments, information and knowledge can be obtained by incorporating Big Data in the analysis.

27 Claims, 8 Drawing Sheets

INTELLIGENT AUGMENTED REALITY (IAR) PLATFORM-BASED COMMUNICATION SYSTEM

CROSS-REFERENCE TO RELATED APPLICATION

The application claims priority to U.S. Provisional Patent Application No. 62/373,822, filed on Aug. 11, 2016 and entitled "An Intelligent Augmented Reality (IAR) Platform-based Communication System;" U.S. patent application Ser. No. 15/367,124 filed on Dec. 1, 2016 and entitled "Methods and Systems for Personalized, Interactive and Intelligent Searches;" U.S. patent application Ser. No. 15/479,269 filed on Apr. 4, 2017 and entitled "Methods and Systems for Real-Time Image and Signal Processing in Augmented Reality based Communications;" U.S. patent application Ser. No. 15/479,277 filed on Apr. 4, 2017 and entitled "Real-Time and Context Based Advertisement with Augmented Reality Enhancement;" and U.S. patent application Ser. No. 15/665,295 filed on Jul. 31, 2017 and entitled "Methods and Systems for Photorealistic Human Holographic Augmented Reality Communication with Interactive Control in Real-Time;" each of which is hereby incorporated by reference herein in its entirety.

TECHNICAL FIELD

The disclosure generally relates to systems, devices and methods for real-time data processing at multiple levels (e.g., raw data, information, knowledge and beyond).

BACKGROUND

Current video conferencing technology allows people to have real-time face-to-face communication remotely. However, it is not widely used due to numerous limitations. Such a system demands network connections with high bandwidth. Image quality suffers dramatically when wireless communication is used. In addition, the current system does not offer privacy option. Some users are shy and hesitant to show their own faces and some users would feel uncomfortable to show their environment. The current system does not allow a user to stay anonymous during the communication. Moreover, the current system cannot provide assistance when there are language or culture barriers for the communication. For example, users participating in the same video conference session may speak different languages, use highly specialized technical terms, or behave according to different cultural background. These barriers can adversely impact personal relationships, business collaborations, and sometimes, can result in serious damage in international trades and diplomatic relations.

Few real-time communication systems (e.g., telephone, video conference, chat platform, messaging, data communication, etc.) offer data augmentation. Even for those that do, the data augmentation is very primitive. For example, different forms of data are simply overlaid over each. The current generation of augmentation does not perform real-time data understanding or apply such understanding to data augmentation. As such, the current real-time communication systems present results that are crude, severely deficient and often completely irrelevant to the users.

What is needed in the field are intelligent and efficient real-time communication methods and systems that can overcome the existing defects and deficiencies.

SUMMARY

In one aspect, disclosed herein is a method for providing real-time augmented reality (AR) data. The method comprise receiving, in real-time at a computer device, raw data continuously over a plurality of time points, the raw data comprising visual data, and optionally one or more of audio data, sensor data, or a combination thereof; generating the real-time AR data by integrating the raw data, AR input data, information input, and knowledge input, based on one or more criteria comprising a user preference, a system setting, an integration parameter, a characteristic of an object or a scene of the raw data, an interactive user control, or a combination thereof, where: the information input is extracted in real-time from the raw data or a variant thereof at one or more time points based on one or more criteria comprising a user preference, a system setting, an integration parameter, a characteristic of an object or a scene of the raw data, an interactive user control, or a combination thereof, the knowledge input is learned based on information extracted from multiple time points, and the real-time AR data comprise information data corresponding to the information input and knowledge data corresponding to the knowledge input; and representing at least a portion of the information data or knowledge data of the real-time AR data with a plurality sets of data parameters, where each set of data parameters comprises text, one or more codes, one or more numbers, one or more matrixes, one or more images, one or more audio signals, one or more sensor signals; or combinations thereof.

In one aspect, disclosed herein is a system for providing real-time augmented reality (AR) data. The system comprises one or more processors; and a nontransitory computer readable medium. The nontransitory computer-readable medium includes one or more sequences of instructions that, when executed by the one or more processors, cause the one or more processors to perform operations that comprise receiving, in real-time at a computer device, raw data continuously over a plurality of time points, the raw data comprising visual data, and optionally one or more of audio data, sensor data, or a combination thereof; generating the real-time AR data by integrating the raw data, AR input data, information input, and knowledge input, based on one or more criteria comprising a user preference, a system setting, an integration parameter, a characteristic of an object or a scene of the raw data, an interactive user control, or a combination thereof, where: the information input is extracted in real-time from the raw data or a variant thereof at one or more time points based on one or more criteria comprising a user preference, a system setting, an integration parameter, a characteristic of an object or a scene of the raw data, an interactive user control, or a combination thereof, the knowledge input is learned based on information extracted from multiple time points, and the real-time AR data comprise information data corresponding to the information input and knowledge data corresponding to the knowledge input; and representing at least a portion of the information data or knowledge data of the real-time AR data with a plurality sets of data parameters, where each set of data parameters comprises text, one or more codes, one or more numbers, one or more matrixes, one or more images, one or more audio signals, one or more sensor signals; or combinations thereof.

In one aspect, disclosed herein is a non-transitory computer-readable medium including one or more sequences of instructions that, when executed by one or more processors, cause the processors to perform operations that comprise receiving, in real-time at a computer device, raw data continuously over a plurality of time points, the raw data comprising visual data, and optionally one or more of audio data, sensor data, or a combination thereof; generating the real-time AR data by integrating the raw data, AR input data, information input, and knowledge input, based on one or more criteria comprising a user preference, a system setting, an integration parameter, a characteristic of an object or a scene of the raw data, an interactive user control, or a combination thereof, where: the information input is extracted in real-time from the raw data or a variant thereof at one or more time points based on one or more criteria comprising a user preference, a system setting, an integration parameter, a characteristic of an object or a scene of the raw data, an interactive user control, or a combination thereof, the knowledge input is learned based on information extracted from multiple time points, and the real-time AR data comprise information data corresponding to the information input and knowledge data corresponding to the knowledge input; and representing at least a portion of the information data or knowledge data of the real-time AR data with a plurality sets of data parameters, where each set of data parameters comprises text, one or more codes, one or more numbers, one or more matrixes, one or more images, one or more audio signals, one or more sensor signals; or combinations thereof.

In some embodiments, the method or operation comprises: comprehensively combining the raw data, the AR input data, the information input, and the knowledge input according to one or more criteria comprising a user preference, a system setting, an integration parameter, a characteristic of an object or a scene of the raw data, an interactive user control, or a combination thereof.

In some embodiments, the method or operation comprises: removing unwanted data from the raw data or a variant thereof, the unwanted data comprising unwanted environment scene data, data that are determined to be irrelevant based on one or more criteria comprising a user preference, a system setting, a characteristic of an object or scene from the raw data, selected data from which information has been extracted, selected information from which knowledge has been learned, or a combination thereof.

In some embodiments, the at least one set of data parameters representing the at least a portion of the information data or the knowledge data is of a different type from the data parameters in the raw data that correspond to the information input or the knowledge input.

In some embodiments, the one or more criteria for extracting the information input further comprises at least one criterion based on big data.

In some embodiments, the knowledge input is learned based on information extracted at multiple time points based on one or more criteria comprising a user preference, a system setting, a characteristic of an object or scene from the raw data, an integration parameter, an interactive user control, at least one criterion based on big data, or a combination thereof.

In some embodiments, the method or operation comprises: selectively compressing at least a portion of the real-time AR data.

In some embodiments, the raw data is received at the computer device from another computer device.

In some embodiments, the method or operation comprises: receiving, in real-time at the computer device, existing AR-data from the other computer device, the existing AR-data comprising existing information data and existing knowledge data.

In some embodiments, the existing information data and existing knowledge data are used to integrate the raw data to render a reconstructed variant of the raw data.

In some embodiments, the method or operation comprises: extracting the information input based on the reconstructed variant of the raw data at the one or more time points based on one or more criteria comprising a user preference, a system setting, at least one criterion based on big data, the existing information data, or a combination thereof.

In some embodiments, a system further comprise a data input and output component comprises a microphone, a camera, a display, a sensor, or a combination thereof.

In some embodiments, the camera comprises a 2D camera, a 3D camera, a 4D camera, a color camera, a near infrared camera, an infrared camera, a thermal camera, a multi-spectra camera, a hyperspectral camera, or a combination thereof.

It would be understood that any embodiments disclosed herein can be applied, when applicable, in any aspect of the invention, alone or in any combination.

Details of one or more implementations are set forth in the accompanying drawings and the description below. Other features, aspects, and potential advantages will be apparent from the description and drawings, and from the claims.

DESCRIPTION OF DRAWINGS

Those of skill in the art will understand that the drawings, described below, are for illustrative purposes only. The drawings are not intended to limit the scope of the present teachings in any way.

Like reference symbols in the various drawings indicate like elements.

DETAILED DESCRIPTION

Overview

The methods and systems disclosed herein relate to real-time learning and its applications in intelligent AR-based communication. For one to appreciate the depth and breadth of learning embedded in the methods and systems, it is necessary to understand data learning in general.

Figure 1A:
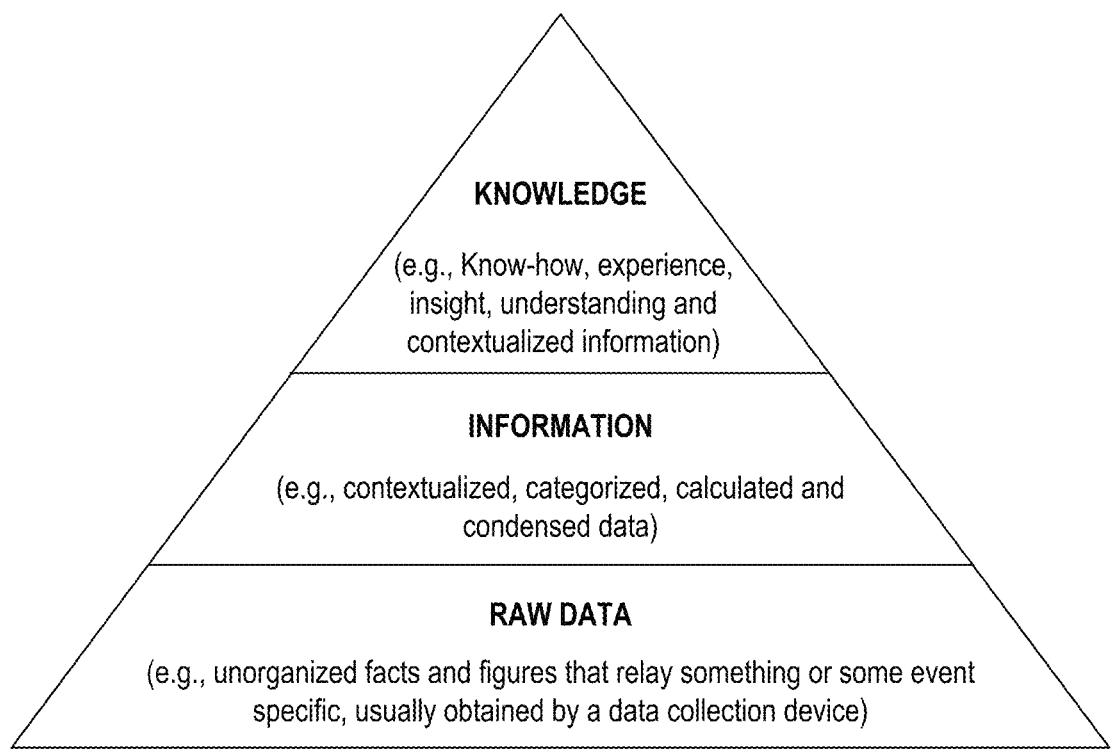
FIG. 1A depicts a diagram illustrating learning at different hierarchical levels.

People are confronted with facts or data all the time about the world around them. In general, understanding of facts can take place in stages or hierarchies: raw data, information, knowledge, and beyond. See FIG. 1A. Typically information is defined in terms of raw data, and knowledge is defined in terms of information. Each layer of the pyramid is distinguished by a process of distillation (reducing, abstracting, extracting, processing, organizing, analyzing, interpreting, learning, and applying) that adds organization, meaning and value by revealing relationships and truths about the world.

As disclosed herein, the term "raw data" refer to unorganized, objective facts, figures, or signals that are collected using a data collection device or equipment such as a camera, a microphone, a sensor, and etc. The facts, figures, or signals are associated with a thing or an event; and they are quantifiable, and can be repeatedly measured, stored, and transferred. In some embodiments, the data collection device can be an independent apparatus or tool such as an audio recorder. In some embodiments, the data collection device can be a component of a larger device such as a camera on a computer or a smart phone device. As disclosed herein, the terms "raw data," "elements," "facts," "figures," "signals," and "measurements" can be used interchangeably. For example, visual data, audio data and sensor data are all forms of raw data. As discussed herein, processed raw data such as raw data that have undergone de-noise operation are still considered raw data.

Raw data are collected using devices that can detect and capture one or more aspects of the phenomenon or event. Data collection can take place at different levels. For example, for visual data, a device can detect and measure magnitudes and/or changes in intensity and color (including hue, tint, shade, saturation, brightness, chroma, and etc.) of visible light signals. More sophisticated equipment will be able to detect and measure properties such as reflection, refraction, dispersion, internal reflection, interference, diffraction, light scattering, and polarization. These properties often reflect how light interacts with its environment. Still more, light signals invisible to the naked eyes can be detected and captured by special devices such as an infrared camera. As disclosed herein, in some embodiments, raw data can be processed before any further processing to enhance properties such as quality, efficiency, accuracy and effectiveness.

In contrast, the term "data" will be more broadly construed to include raw data and anything derived from raw data such as information, knowledge, AR data, or combinations thereof. In addition, as disclosed herein, the term "data" also include but are not limited to material stored locally on a computer device, material received from another computer device via network connection, or material that can be retrieved from the Internet.

As disclosed herein, the term "information" can be used to refer to as contextualized, categorized, calculated and condensed data. Information can be extracted from raw data, for example, through organization and by applying relevance, purpose, context and etc. For example, temperature readings themselves can provide little or no value. However, if the reading is linked with a particular purpose and relevance, the raw data can provide information. For example, an ambient temperature measurement and a body temperature measurement having the same value will provide different meanings. For example, an ambient temperature will reflect a weather condition while a body temperature can reflect a health condition.

For example, information can be extracted from a visual characteristic, an audio characteristic, a sensor characteristic, or combinations thereof. For example, a visual characteristic includes but is not limited to a spatial characteristic, a size characteristic, an edge characteristic, a shape characteristics, a motion characteristics, a color characteristic, an exposure characteristic, a brightness characteristic, a shadow characteristic, a highlight characteristic, a contrast characteristic, a light illuminance and reflectance characteristic, a temporal characteristic, or a transparency characteristic, a depth characteristic, a material characteristic, or a combinations thereof. In some embodiments, the visual characteristic comprises a three-dimensional spatial characteristic.

In some embodiments, an audio characteristic includes but is not limited to a pitch/tone characteristic, a frequency characteristic, a magnitude/amplitude characteristic, a speed characteristic, a speech pattern characteristic, an acoustic characteristic, a noise characteristic (e.g., ambient noises or other environmental noises), a delay characteristic, a distortion characteristic, a phase characteristic, or a combination thereof.

In some embodiments, a sensor characteristic can include a sensitivity characteristic, a frequency characteristic, a magnitude/amplitude characteristic, or a combination thereof.

In some embodiments, information can be associated with an object or a scene from the raw data.

As disclosed herein, information can be extracted at different levels, depending on the quality and quantity of the raw data, or depending on one or more criteria for the extraction. For example, a simple ultrasound device (such as a Doppler) can be used to measure the heart rate of a fetus, while a sophisticated ultrasound machine can allow a doctor to "visualize" the structure of the fetal heart. As such, information extracted from data obtain by the sophisticated ultrasound machine will be at a much deeper and more complete level.

In some embodiments, one or more criteria are applied when extracting information from raw data. Exemplary criteria include but are not limited to a user preference, a system setting, a characteristic of an object or scene from the raw data, an integration parameter, an interactive user control, at least one criterion based on big data, or a combination thereof. In some embodiments, a Big Data-based criterion can also be applied.

As disclosed herein, the term "knowledge" can be used to refer to know-how, experience, insight, understanding, and contextualized information. Knowledge is often actionable. For example, an ambient temperature of 100° F. would be deemed hot while 110° F. would be deemed dangerously hot. When it is hot, a person may take precaution to drink more water and stay in shade when outside. When it is dangerously hot, a person may avoid the outdoor entirely.

Obtaining knowledge involves applying complex cognitive processes such as perception, synthesis, extraction, association, reasoning and communication to information or information. In general, knowledge have more value than information because they provide the basis for understanding, explaining and drawing insights about something or some event, which can be used to formulate policy and actions.

In some embodiments, the same information in different context can provide different knowledge. For example, an adult will be considered to have a fever if readings of the person's body temperature reaches 100.4° F. or above. However, a toddler will not be considered to have a fever if readings of the child's body temperature reaches 101.4° F. or above. Once the cause of a "fever" is diagnosed, a doctor may prescribe medicine to a patient to treat either the symptoms or the causes.

As disclosed herein, knowledge can be obtained via cumulative learning from information. In some embodiments, the information can be associated with multiple time points. In some embodiments, the time points are consecutive. In some embodiments, the time points are non-consecutive. In some embodiments, knowledge is learned from more than one type of information such as two or more types, three or more types, four or more types, five or more types, or six or more types. In some embodiments, ten or more types of information can be used.

In some embodiments, a secondary characteristic can also be associated with an object or a scene from the raw data.

As disclosed herein, knowledge can also be learned at different levels, depending on the quantity and quality of the available information (which are ultimately determined the quality and quantity of the raw data). In the same example using Doppler versus a sophisticated ultrasound machine, which a doctor may be able to use a Doppler to decipher irregular fetal heartbeats (knowledge). Using a sophisticated ultrasound machine, a trained physician will be able to determine whether irregular heartbeats correspond to any structural defects in the heart of an unborn fetus (knowledge). The knowledge from more sophisticated analysis can be relied upon for making a decision as to whether a heart surgery should be performed to save a baby with severe congenital heart defects as soon as she is born.

In some embodiments, one or more criteria are applied when learning knowledge from information. Here, the criteria used can be the same or different from those used when extracting the information. Exemplary criteria include but are not limited to a user preference, a system setting, a characteristic of an object or scene from the raw data, an integration parameter, an interactive user control, at least one criterion based on big data, or a combination thereof.

In the following, two comprehensive examples are provided in the context of AR-based real-time communications in accordance with the current disclosure. The examples can illustrate the differences between raw data, information, and knowledge.

In a first example, two people converse in an AR communication setting. Each user can see and hear the other side. At one point, one user exclaims: "What if we go to Hawaii?!" At the same time, she moves her hands up and down excitedly and her face is getting red.

In this example, the raw data include visual and audio signals. Certain audio signals are associated with a high magnitude. At the next level, for example, the communication system can recognize, from the audio data, that the user emphasized the word "Hawaii." From the visual data, the communication system extracted hand movements, the user's face and related features. Here, the information can include an emphasis on the word "Hawaii," moving hands, facial expression and redness. At the next level, for example, the communication system can put together the extracted information to learn that the user is happy and excited (from the tone of her voice, her facial expression and redness, and etc.) about Hawaii as a travel destination. Here the information can be the conclusion that the user wants to choose Hawaii as a possible travel destination.

Based on the information and knowledge, the communication system can augment, in real-time, data concerning the user (e.g., an image or a video) with images or video of Hawaii and provide the user options to view the augmented data in real-time. For example, the system can offer an image of the user on the Waikiki beach as her new background for the communication.

In a second example, a doctor and a patient communicate remotely using an AR-based real-time communication system in accordance with the current disclosure. Visual, audio and sensor data are collected simultaneously at the patient end. It is required that the patient be in contact with one or more sensors for measuring heart rate, blood pressure and oxygen level. The doctor can see the patient making some movements and receive sensor data of the user's heart rate and blood pressure.

In this example, the raw data include visual, audio and sensor data. At the next level, for example, the communication system can recognize from the visual data that the user is sitting and making slow movements. The communication system also recognizes that the use has a heart rate of 180, and blood pressure readings (high: 240 and low: 150). The communication system also recognizes that the user's breathing pattern may be sporadic. Oximeter indicates low oxygen level in the user's blood.

At the next level, the communication system can put together the extracted information to learn that the user at a high risk of heart attack or some other heart/blood related problems and needs medical attention (e.g., the user is not undergoing vigorous physical activities, his heart rate and blood pressure values are alarmingly high).

Based on the information and knowledge, the communication system can augment, in real-time, data concerning the user (e.g., three dimensional model of the user's heart) and cause the heart model to move according to the observed heart rate, blood pressure and breathing patter. The augmented heart movement can be viewed in real-time.

Here, the doctor can provide interactive control over the augmented data from the patient and request to see simulated heart movements in the patient with his heart rate, blood pressure. Alternatively, the AR data from the patient is further augmented at the doctor's end by integrating the patient's past medical records that are relevant. For example, if a past CT scan or MRI had suggested a potential heart defect, the doctor may be able to predict a risk of immediate heart attack and arrange for the patient to be hospitalized immediately.

Exemplary System Embodiments

Figure 1B:
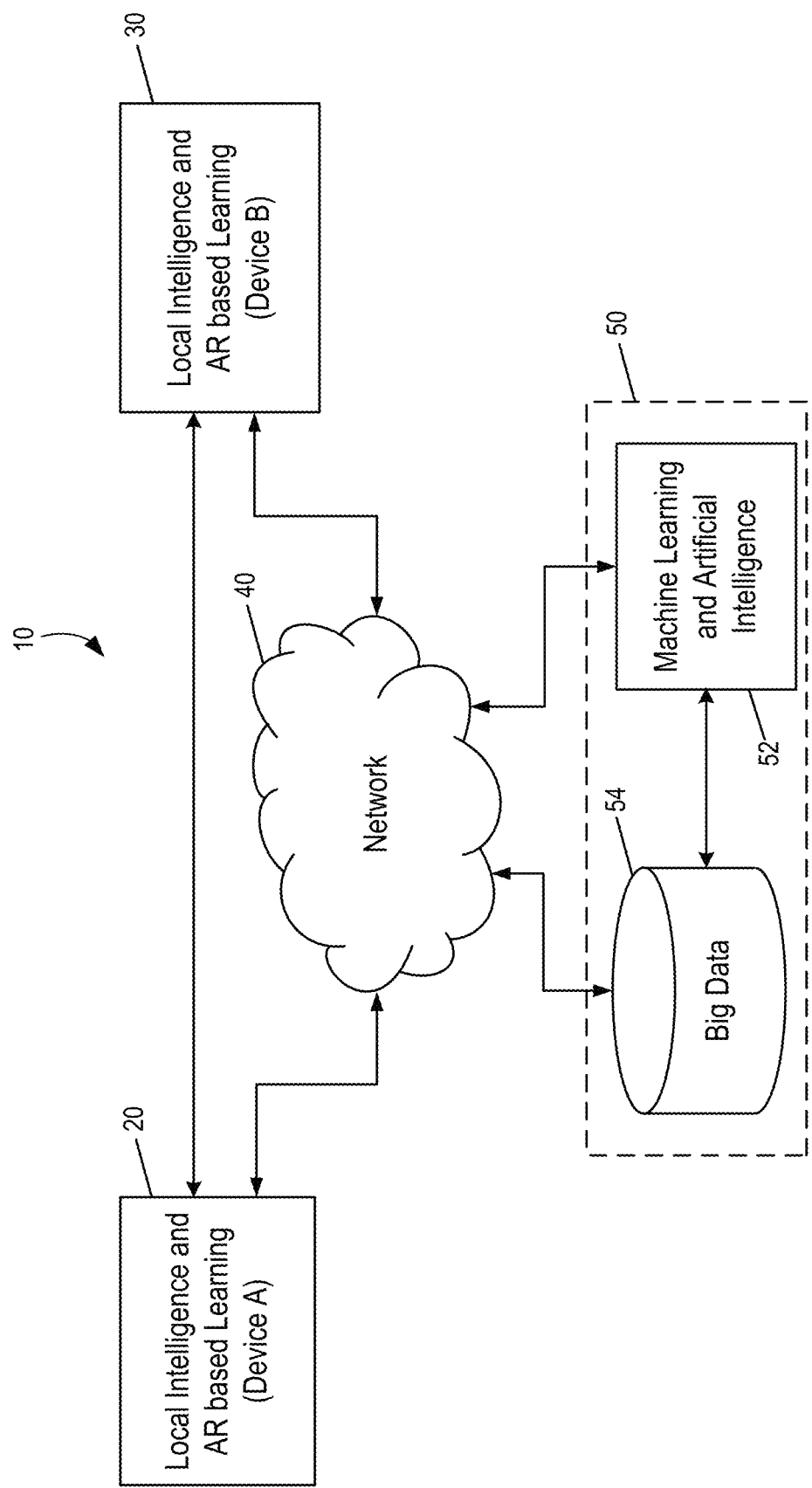
FIG. 1B depicts an exemplary system for carrying out intelligent AR-based real-time communication.

FIG. 1B depicts an exemplary system for real-time communicated based on a multi-leveled real-time learning and processing of data. As disclosed herein and unless otherwise specified, the term "data" can be broadly construed to encompass raw data, information, knowledge, AR input data, and beyond. Exemplary system 10 includes a device 20 and device 30, connected to a remote intelligence server 50 via internet 40.

As disclosed herein and unless otherwise specified, learning and processing or just processing are broadly construed to cover all forms of treatment or distillation of data, information, knowledge and beyond. Exemplary treatment and/or distillation include but are not limited to quality improvement, error correction, discovery, digestion, dissection, fusion, analysis, abstraction, understanding, interpretation, manipulation, modification, argumentation, perception, synthesis, extraction, identification, association, reasoning, reducing, organizing, application, format conversion, transfer, communication, and etc.

As disclosed herein, each user device (e.g., elements 20 and 30) is equipped with functionalities for carrying out learning based on artificial intelligence and augment reality (AR) based learning and processing of raw data, information, and knowledge.

In some embodiments, data learning and processing can be applied to one or more of raw data, information and knowledge individually in any possible combinations.

Results from learning and processing of data, information, and knowledge can be transferred between user device 20 and user device 30, and/or one or both of user device 20 and user device 30 and intelligence server 50.

For example, user device 20 acquires, processes, and augments data (e.g., audio, video, and sensor data) and sends the processed data to intelligence server 50 or user device 30 via wired or wireless network communication. In some embodiments, user device 20 sends the processed data directly to device 30 (e.g., via infrared transmission). In some embodiments, raw data can be transfer in addition to or in lieu of processed data.

In some embodiments, one or both of the devices 20 and 30 have their own local intelligence and AR processing module to augment data locally. In some embodiments, one or both of the devices 20 and 30 have their own have some intelligence analysis and processing functionalities. In some embodiments, one or both of the devices 20 and 30 have their own can also utilize a remote Big Data database (e.g., on intelligence server 50) to perform more and deeper form of learning and processing based on artificial intelligence to obtain more complete and deeper level of information, knowledge, and beyond. In some embodiments, the learning and processing can take place in the reverse direction. For example, based on the learned information and/or knowledge, intelligence server 50 can use or modify existing data or create new data incorporating the information and/or knowledge.

In some embodiments, data, information, or knowledge from either or both devices 20 and 30 can be saved in the Big Data database and also be sent to intelligence server 50 for additional learning and processing based on artificial intelligence.

In some embodiments, intelligence server 50 can process data with the intelligence information based on a Big Data database (e.g., saved locally on the server to accessible via network communication) to digest information/knowledge automatically and provide the digested information/knowledge as intelligence data to both the device that has sent the original raw or processed data (e.g., device 20) and a receiving device (e.g., device 30) based on the user preference and system setting respectively.

In some embodiments, the data sent to a sender device or a receiver device can be different due to their different user preference and system settings.

In some embodiments, a receiver device (e.g., device 30) can receive data, raw or process, from one or both of device 20 and intelligence server. Receiver device 30 can further process the received data, including, for example, interpreting and converting the received data to forms and format suitable for receiver device 30, augmenting the data with learned information and/or knowledge, and outputting the resulting data in various forms. In some embodiments, the output data will be presented based on a user's preference and/or system setting such as displaying visual data, playing audio data, and controlling corresponding sensors.

In some embodiments, device 30 can function as a sender device and transfer data to device 20 and intelligence server 50. In some embodiments, the systems and methods disclosed herein can be applied to facilitate an interactive two-way/multiple-way communication system.

In some embodiments, all aspects of data processing (e.g., raw data processing, information extraction, knowledge learning, AR-based data augmentation, representation of AR data, data compression, and etc.) can take place in one device via a secure processor and a secure channel, with secured storage including encryption to ensure data security. In some embodiments, part of the data processing can take place via a secure processor, secure channel, with secure storage including encryption to ensure security while other parts of the data processing can take place via a processor, channel and storage with regular security level. In some embodiments, all aspects of data processing can take place via a processor, channel and storage with regular security level.

As disclosed herein, intelligence server 50 includes offers numerous advantage. For example, functionalities for carrying out artificial intelligence and AR based learning and processing of data can take place with enhanced efficiency and speed on server 50. In addition, such data learning and processing can implement big data stored on databased 52 on server 50.

As disclosed herein, a computer device (e.g., device 20 or 30) includes, as an integral component or being communicatively connected to, a camera and optionally a microphone, or one or more sensors. In some embodiments, the camera is an integral part of the user device such as a computer, a cell phone, or video recorder. In some embodiments, the camera is an external hardware component that can be connected to the user device. In some embodiments, the user device is a network-enabled camera. Preferably, the camera is a depth camera. In some embodiment, the image/audio capturing device includes a set of cameras. As disclosed herein, the user device should be equipped with a CPU/GPU processor, a camera, a microphone, a display, a speaker, a communication unit, and a storage. It includes but is not limited to a desktop computer, a laptop computer, a smartphone device, a personal digital associates, a network-enabled camera, a tablet, an AR glass, an AR hamlet, a VR glass, a smart TV, and etc. The camera includes but is not limited to a 2D, 3D or 4D camera, a color camera, a gray scale camera, a regular RGB camera, an infrared (IR) camera, a near infrared (NIR) camera, a thermal camera, a multiple spectrum camera, a hyperspectral camera, a 360 degree camera etc. A microphone can be any device that is capable of detecting and capturing audio signals. A sensor can be any component, module, or subsystem that can detect events or changes in its environment and send the signals to another device (e.g., a computer processor). Exemplary signals include but are not limited to those associated with heartbeat, blood pressure, orientation, temperature, motion, altitude, pressure, proximity, acceleration, and etc. As disclosed herein, methods and systems for generating real-time AR data are described by way of example. However, one of skill in art would understand that the methods and systems can be applied to other types of data. Additionally, other types of data can be processed, separately or in combination with images data to create the AR-based data as disclosed herein. An example is combination of sound data with image data. Another example is combination of sensor data with image data. As disclosed herein, sensor data comprise vibration data, temperature data, pressure data, orientation data, proximity data, and etc.

Exemplary implementations of functionalities for carrying out artificial intelligence based learning and AR based processing of data are described in detail in connection with FIG. 1C.

Figure 1C:
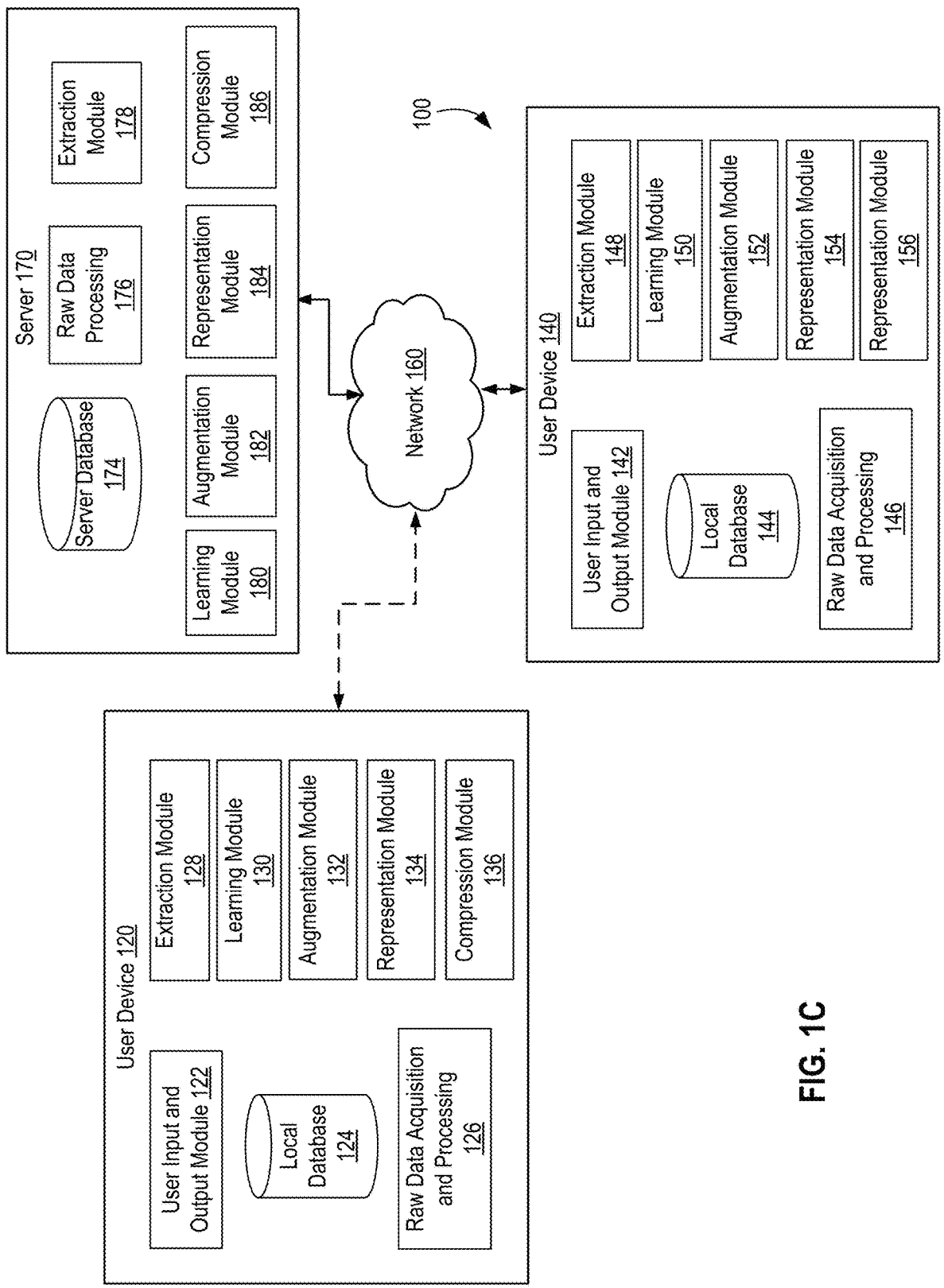
FIG. 1C depicts an exemplary system for carrying out intelligent AR-based real-time communication.

FIG. 1C depicts an exemplary system for real-time AR-based communication based on multi-leveled real-time learning and processing. Exemplary system 100 includes a computer device 120 and a computer device 140, connected to a remote intelligence server 170 via internet 160. As disclosed herein, learning and processing of data can take place on one or more of the devices.

Exemplary computer device 120 depicts a local device that is equipped with multiple functionalities, including a user input and output (I/O) module 122, a local database 124, and multiple functional modules (e.g., raw data acquisition and processing module 126, extraction module 128, learning module 130, augmentation module 132, representation module 134, compression module 136, and etc.). As disclosed herein, a local device is accessible to a real life object and can be operated by a user. In some embodiments, the user is the real life object; for example, in real-time AR-based communications. Device 120 exemplified a local device that is capable of performing in real-time nearly all functionalities needed for carrying out a real-time AR-based communication. For example, such functionalities include capturing visual and audio data (i.e., raw data) of a user (or a real life object other than the user) in a scene, separating the user (or a real life object other than the user) or scene, extracting information based on the raw data, learning knowledge based on the extracted information, and creating real-time AR data based on information, knowledge, AR input data, the extracted the real life object or scene, a real-time interactive user control, a user preference, a system setting, and etc. Any applicable computer device can be used as device 120, including but not limited to those disclosed in connection with device 20 and device 30 of FIG. 1B.

In some embodiments, user device 120 includes a user input and output module (I/O module) 122. For example, I/O module 122 can receive user input to user device 120 and present output from user device 102, using text, audio, video, motion, and/or haptic output mechanisms. In some embodiments, I/O module 122 includes one or more data collection components such as a camera, a microphone, a keyboard, a mouse, a touch sensitive screen, one or more sensors, and etc. In some embodiments, I/O module 122 is also configured to detect and track eye movement, facial expression and etc. In some embodiments, I/O module 122 or user device 120 further includes one or more sensor devices for collecting data such as heartbeat, blood pressure, orientation, temperature, motion, altitude, pressure, proximity, acceleration, and etc.

In some embodiments, I/O module 122 can also present audio, visual, motion, and/or haptic output to a user. For example, I/O module 122 display integrated images or videos on a monitor a user of device 120. In some embodiments, the I/O module 122 includes one or more output components such as a monitor (can be touch sensitive), a speaker, a touch sensitive screen, and one or more sensors. In some embodiments, the output devices allow a user receive a physical experience such as touching (e.g., a user can receive a remote handshake or kiss).

In some embodiments, the data collection and output components form as an integral part of I/O module 122 or user device 120. In other embodiments, the data collection and output components are external devices that can be coupled to a computer device (e.g., device 120) and function as I/O module 122.

As disclosed herein, real-time interactive controls are used to dynamically generate the real-time AR data. For example, I/O module 122 can receive a gesture input, a body movement, an eye movement, an expression, a typed command, a mouse action (e.g., a click, a drag and drop), or a voice input from a user to initiate real-time AR-based communication (e.g., by starting the processing for acquiring data and eventually generating real-time AR data). In some embodiments, similar inputs can be used to change the course of the communication or its content by specifying in real-time user preference or selecting a system preference. I/O module is able to capture user input from many different perspective. The methods/systems can be used by users with one or more forms of disabilities. For example, a blind person may sign and make other gestures, or use voice commands while a deaf/mute person can gesture, use facial expression or eye movement.

In some embodiments, I/O module 122 can present GUIs that enable or support the functionalities of the methods/systems described herein, including but not limited to a local database 124, and multiple functional modules (e.g., raw data acquisition and processing module 126, extraction module 128, learning module 130, augmentation module 132, representation module 134, compression module 136, and etc. In some embodiments, I/O module 122 includes a plurality of menu commands, each corresponding to the functionality of one or more of the query processing modules.

In some embodiments, I/O module 122 provides menu options such that a user can select one or more options to initiate one or more functions. For example, a user can click an icon to start image capturing process. In addition, multiple categories of AR input data (e.g., virtual environment related material) can also be provided via menu options.

In some embodiments, a user may use I/O module 122 to request material that is available either on the local user device 120 or can be obtained via network connection from service device 170 or another user device 140. For example, I/O module 122 can allow a user to use voice command to request AR input data such as a certain type of virtual environment (e.g., images of a European medieval castle). Once the images are delivered (either locally or via network connection), a user can request that the images be processed to construct a virtual environment.

In some embodiments, a user may use I/O module 122 to manage various functional modules. For example, a user can request via use I/O module 122 to change AR input data (e.g., a different virtual environment) while a real-time communication is in process. A user can do so by select a menu option or type in a command discretely without interrupting the communication.

As disclosed herein, a user can use any type of input to direct and control the methods/systems via I/O module 122, such as a gesture input, a body movement, an eye movement, an expression, a typed command, a mouse action (e.g., a click, a drag and drop), or a voice input.

In some embodiments, device 120 further comprises a local database 124. For example, local database 124 can store captured data such as images, videos, audio files, sensor data, received or pre-existing data such as AR input data, user preferences, and system settings; and processed data such as information, knowledge, partially or fully integrated AR data. In some embodiments, local database 124 stores user specific information; for example, a user can store private data, user preference setting, and data for one or more preferred virtual environment for generating real-time AR data. In some embodiments, local database 124 can store data retrieved from another device or a server. In some embodiments, local database 124 can store data retrieved in real-time from internet searches.

In some embodiments, local database 124 sends data to and receives data from one or more of the functional modules, including but not limited to raw data acquisition and processing module 126, extraction module 128, learning module 130, augmentation module 132, representation module 134, compression module 136, and other functional modules. As disclosed herein, these functional modules can broadly cover all forms of treatment or distillation of data, information, knowledge and beyond. Exemplary treatment and/or distillation include but are not limited to quality improvement, error correction, discovery, digestion, dissection, fusion, analysis, abstraction, understanding, interpretation, manipulation, modification, argumentation, perception, synthesis, extraction, identification, association, reasoning, reducing, organizing, application, format conversion, transfer, communication, and etc.

In some embodiments, functionalities of two or more modules can be combined. In some embodiments, one or more sub-modules can be used to carry out one type of functionality. For example, extraction module 128 can performs data discovery and extract information from raw data received in real-time. For example, data in each type can be analyzed to identify or extract information such as human feature patterns (e.g., face, iris, body, gesture and etc.), voice patterns, bio-status, or any other physical or non-physical features of an object. In some embodiments, learning module 130 further organizes and analyzes information identified at module 128 determine knowledge. For example, whether a person has a fever or can be diagnosed with a certain disease.

In some embodiments, one or more of the functional modules can evaluate and analyze each type of real-time data separately (e.g., visual, audio or sensor). In some embodiments, a functional module can evaluate and analyze multiple type of real-time data at the same time (e.g., visual and sensor data can be used to detect onset of a heart attack).

In some embodiments, user device 120 comprises a raw data acquisition and processing module 126, which can be also referred to as "acquisition and processing module 126" or "module 126." For example, acquisition and processing module 126 can obtain data using one or more data collection components such as a camera, a microphone, a keyboard, a mouse, a touch sensitive screen, one or more sensors, and etc. In some embodiments, module 126 is also configured to detect and track eye movement, facial expression and etc. In some embodiments, module 126 or user device 120 further includes one or more sensor devices for collecting data such as heartbeat, blood pressure, orientation, temperature, motion, altitude, pressure, proximity, acceleration, and etc. The functionalities of I/O module 122 and acquisition and processing module 126 overlap. Many of the data acquisition components also form part of I/O module 122.

In some embodiments, acquisition and processing module 126 includes a camera. In some embodiments, the camera is depth enabled. In some embodiments, two or more cameras are used. In some embodiments, a built-in or an external microphone can be used for audio collection. In some embodiments, module 126 captures multiple images. In some embodiments, module 126 also captures voice data. In some embodiments, module 126 captures a video continuously. In some embodiments, module 126 can capture sensor data by using one or more sensors associated with device 120. As disclosed herein, sensor data comprise bio-stats date such as heart beat and breathing pattern, vibration data, temperature data, pressure data, orientation data, proximity data, etc. In some embodiments, module 126 captures data of multiple types.

As disclosed herein, after capturing raw data of a user, module 126 can also process the raw data to enhance their quality for subsequent processing. In some embodiments, acquisition and processing module 126 can perform standard data processing algorithms such as noise reduction, signal enhancement, signal normalization, and etc. In some embodiments, module 126 can apply one or more filters to remove or add a particular form of data. For example, module 126 can process the data in one or more domains (e.g., perform spatial domain, frequency domain, spectrum domain, wavelet-domain, and/or hybrid of these domains) to remove noise and enhance data quality.

In some embodiments, device 120 comprises an information extraction module 128, where information is extracted from raw data. As disclosed herein, "information extraction module 128," "extraction module 128," and "module 128" can used interchangeably. As disclosed herein, information can be extracted by contextualizing, categorizing, calculating and condensing data. In some embodiments, information extraction can also take place according to one or more criteria comprising a user preference, a system setting, an integration parameter, a characteristic of an object or a scene of the raw data, an interactive user control, or a combination thereof. Each of the criterion can be seen as a way of organizing and contextualizing raw data. In some embodiments, at least one criterion is based on Big Data.

As disclosed herein, the extracted information can be represented by information data. In some embodiments, the information data can include text, one or more codes, one or more numbers, one or more matrixes, or combinations thereof. In some embodiments, the information data can include one or more images, one or more audio signals, one or more sensor signals; or combinations thereof. Here, the images, audio signal and sensor signals can be, and preferably are, different from those included in the raw data from which the information is extracted.

In some embodiments, real-time information extraction is triggered once data capture is initiated. In some embodiments, information extraction is achieved through organizing data. For example, when the raw data comprise multiple types of data (e.g., visual, audio or sensor data of an object or a scene), data organization can be achieved by separating the data according to its data type. In some embodiments, each type of data is further separated based on the content of the data; for example, data corresponding to an object can be organized separately from the data corresponding to a scene. For example, real-time information extraction of an object comprises identifying boundaries between the object and its environment, for example, based on their differences in relative locations within the image, contrast, light, color, thermal properties, and etc. In some embodiments, image data are collected using a depth-enabled camera and the depth information is used to separate the object into background and foreground before extracting information from either. In some embodiments, extraction module 128 can extract information through real-time object recognition and data separation. For example, object recognition comprises separating a person from the environment. In some embodiments, object recognition includes detecting different body parts of a person. In some embodiments, object recognition also includes associating certain characteristics with body parts of the person, which can facilitate extraction of information relating to motion, size.

In some embodiments, extraction module 128 extracts information by further organizing (e.g., separating), in real-time, the data into one or more sub-categories associated with an object and its environment based on one or more characteristics. For example, the portion of the same object that shares the same or similar visual characteristics (e.g., color, darkness level) can be organized together. In some embodiments, information extraction utilizes a comprehensive characteristic-based mechanism, including artificial intelligence based mechanisms. For example, the comprehensive characteristic-based mechanism can recognize one or more characteristics of a person, an object and the environment, and their differences. Exemplary characteristics can include and is not limited to a visual characteristic such as a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof. In some embodiments, the spatial characteristic comprises a three-dimensional spatial characteristic. In some embodiments, the characteristic can be a real-time learned characteristic including but not limited to color, shape, edge, light reflectance, light illuminance, exposure, brightness, shadow, highlight, contrast, motion, depth, material, or combinations thereof. In some embodiments, a pre-learned feature also includes but is not limited to color, shape, edge, light reflectance, light illuminance, exposure, brightness, shadow, highlight, contrast, motion, depth, material or combinations thereof.

In some embodiments, raw data are organized according to a user preference or a system setting; for example, through elimination of irrelevant data or focusing on one or more types of data. In some embodiments, user preferences can be set up to specify the type of data for information extraction, irrelevant data may be removed or ignored to facilitate information extraction from the relevant data. For example, if a doctor is interested in medical data relating to a heart condition, information extraction will focus on data such as color of the face, pulse/heartbeat, breathing data, blood pressure, and etc. In another example, if the doctor is interested in information about the skin condition of the patient, information extraction can be carried out only for skin-related data.

In some embodiments, information extraction can be performed with interactive user controls. For example, in a remote diagnosis session based on the methods/systems of the current disclosure, the doctor may request a certain type of information. For example, the doctor may request a heart rate be calculated based on heartbeat data captured by one or more sensors.

In some embodiments, the system/method disclosed herein can include system settings specifying data types that are relevant to each other under a certain pre-defined context. Data of the specified data types can be selected and processed for information extraction.

By applying various analytic tool, data representing different objects and scene can be organized and put into context. For example, by comparing positional data of an object from different images obtained at different time points, it is possible to extract positional or motion information of the object. In some embodiments, it may be possible to calculate or compare relative speed when multiple objects are present in the raw data.

In some embodiments, extraction module 128 extracts information from one type of data. In some embodiments, extraction module 128 extracts information from multiple types of data. For example, physical appearance of a person can be combined with body temperature reading for additional information extraction. In some embodiments, the multiple types of data can be fused prior to information extraction.

In some embodiments, information extraction process as disclosed herein can be completed in one round or in multiple rounds. In some embodiments, a round of rough information extraction can be performed first before one or more additional rounds of fine extraction are carried out. For example, rough extraction can provide information such as heart rate, while a deeper level of information extraction can lead to information of one or more complete cardiac cycles: such as that of the inflow phase, isovolumetric contraction, outflow phase and isovolumetric relaxation. A still-deeper level of information extraction would include extracting information associated with A-V valve closure, aortic valve opening, isovolumetric contraction, ejection, isovolumetric relaxation, rapid inflow, A-V valve opening. Exemplary information can include aortic pressure, atrial pressure, ventricular pressure, ventricular volume. In some embodiments, information is extracted from electrocardiogram and phonocardiogram. As noted, the level at which information can be extracted can be limited by the analytical methods that are available, the quantity, type and quality of the raw data.

Figure 3:
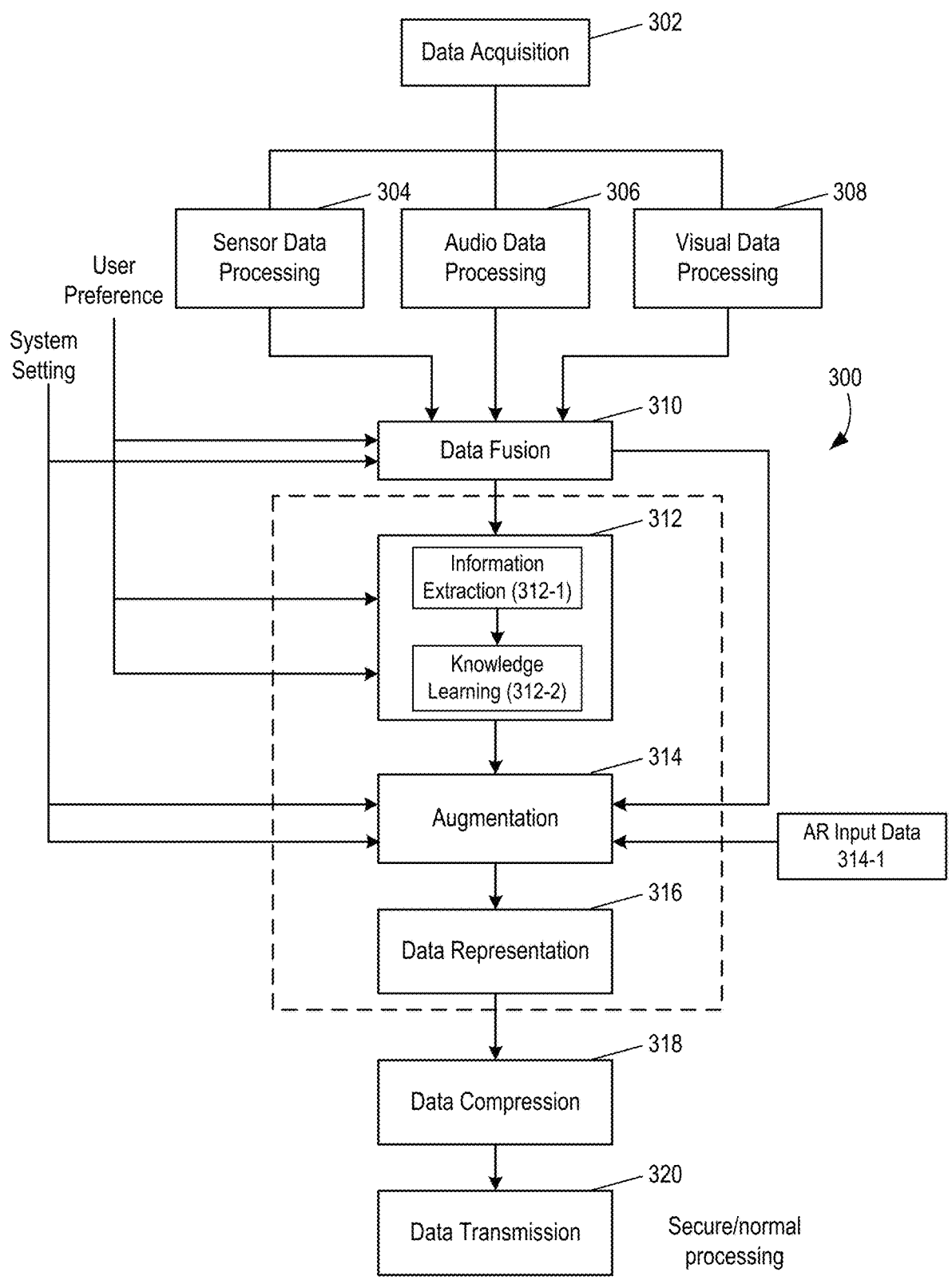
FIG. 3 depicts example process on a computer device for carrying out intelligent AR-based real-time communication.
Figure 4:
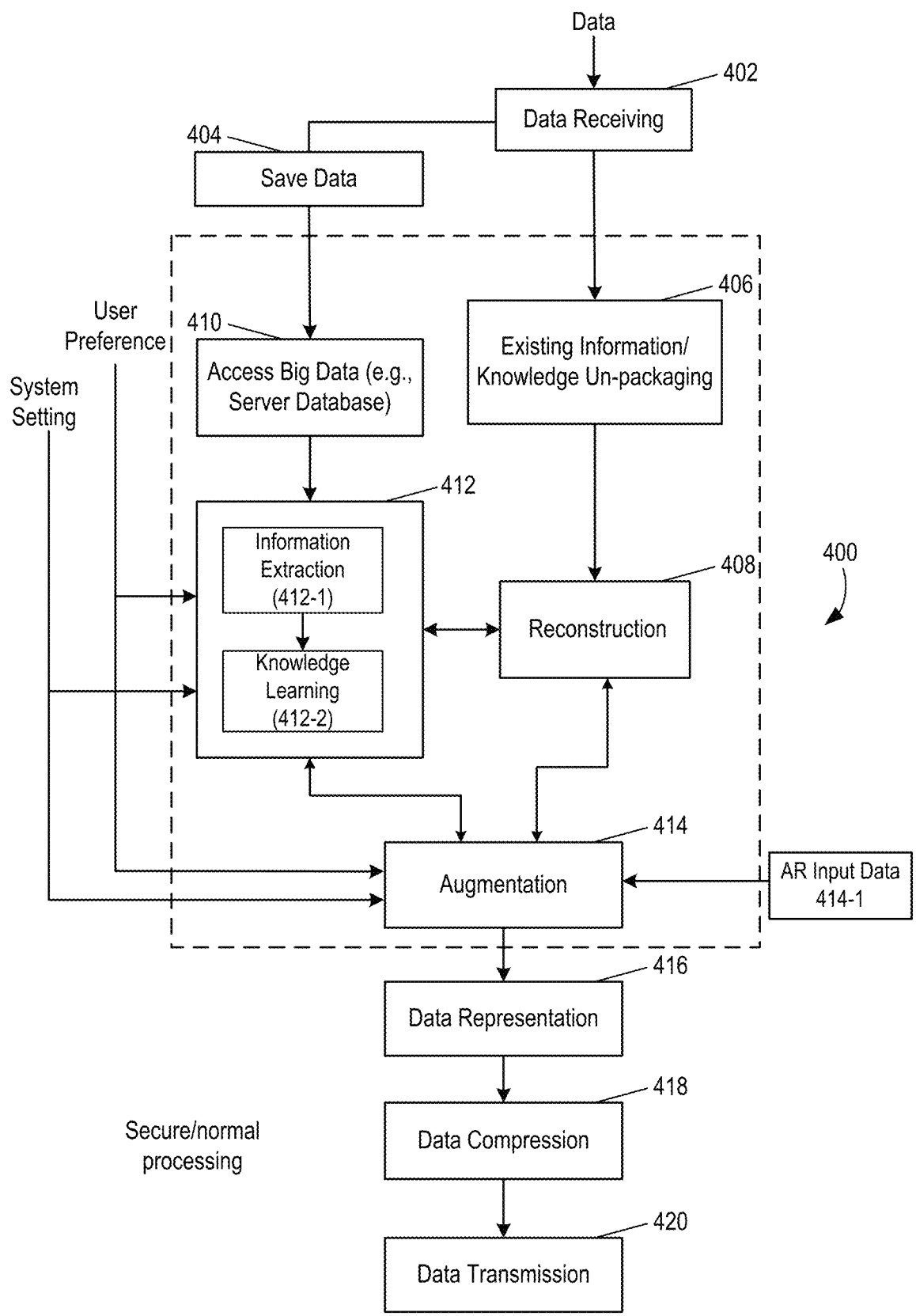
FIG. 4 depicts example process on a computer device for carrying out intelligent AR-based real-time communication.
Figure 5:
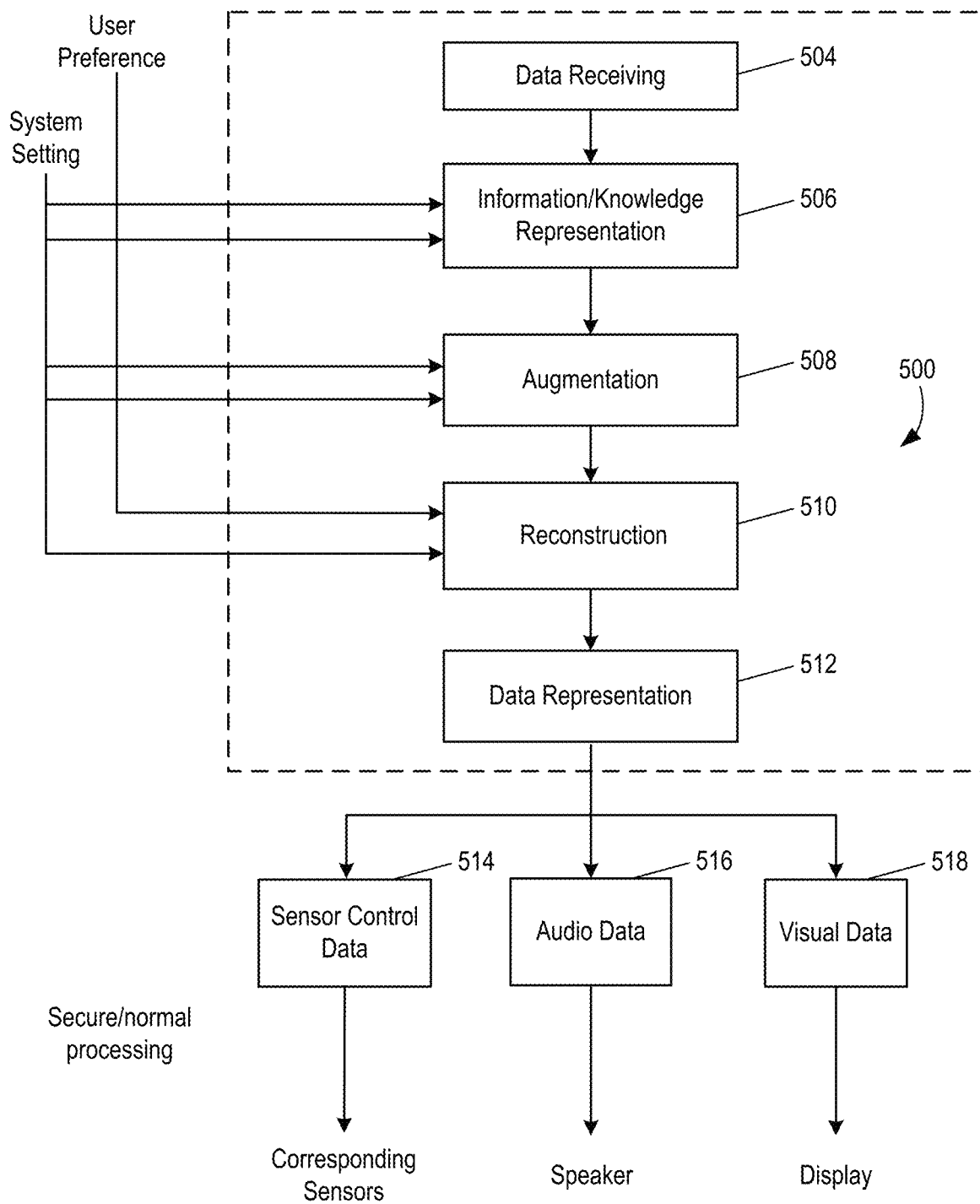
FIG. 5 depicts example process on a computer device for carrying out intelligent AR-based real-time communication.

In some embodiments, extraction module 128 can extract real-time information using pre-learned information. For example, pre-existing patterns of objects and scene can be used as starting points before further real-time information learning. In some embodiments, information extraction can take place multiple times on different devices. For example, an initial information extraction can take place on a local device which limited computing power. The initial information extraction can be crude and limited in depth. The extracted information and raw data can be transferred to another computer device with more computing power and better access to a more comprehensive database (e.g., including Big Data) where further information extraction takes place. Exemplary embodiments of multi-stage information extraction processes are illustrated in FIGS. 3 through 5.

In some embodiments, information extraction can be performed based on machine learning and pattern recognition methods; e.g., deep learning, neural network, feature point based approaches, principal component analysis (PCA), linear discriminant analysis (LDA), etc.

In some embodiments, device 120 comprises a learning module 130, which can also be referred to as "knowledge learning module 130" or "module 130." As disclosed above, knowledge is learned or derived based on analysis of information that has been extracted from raw data.

In some embodiments, knowledge is learned by understanding and contextualizing information. In some embodiments, such contextualizing can be achieved by organizing relevant information into categories. This added level of organization can aid understanding of data. For example, in the example where a patient has high risk of an impending heart attack, the doctor can learn this knowledge by organizing the relevant information together. For example, the patient showed alarming signs such as a flushed face, fast heart rate, very high blood pressure, fast and short breath, slow movement, and etc.

Like information extraction, knowledge learning can also take place according to one or more criteria comprising a user preference, a system setting, an integration parameter, a characteristic of an object or a scene of the raw data, an interactive user control, or a combination thereof. For example, a method/system specifically designed for medical diagnosis can have one or more pre-determined categories for each disease that can be possibly identified based on non-invasive data such as visual data, audio data, and sensor data. For example, a category for heart disease would inform the method/system to focus on certain types of information such as face color, breathing pattern, heart rate, blood pressure values, and etc. In some embodiments, the method/system also provides reference standards against which the obtained information will be compared and results from the comparison can lead to learned knowledge. In some embodiments, at least one criterion is based on Big Data.

As disclosed herein, the learned knowledge can be represented by knowledge data. In some embodiments, the knowledge data can include text, one or more codes, one or more numbers, one or more matrixes, or combinations thereof. In some embodiments, the knowledge data can include one or more images, one or more audio signals, one or more sensor signals; or combinations thereof. Here, the images, audio signal and sensor signals can be, and preferably are, different from those included in the raw data from which the knowledge is indirectly derived.

In some embodiments, knowledge learning comprises organizing (e.g., separating), in real-time, available information into one or more sub-categories associated with an object and its environment based on one or more characteristics. For example, information reflecting visual characteristics of an object can be organized into one category. In some embodiments, knowledge learning utilizes a comprehensive characteristic-based mechanism, in addition to using, for example, artificial intelligence based mechanisms to facilitate learning. For example, the comprehensive characteristic-based mechanism can recognize one or more characteristics of a person, an object and the environment, and their differences. Exemplary characteristics can include and is not limited to a visual characteristic such as a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof. In some embodiments, the spatial characteristic comprises a three-dimensional spatial characteristic. In some embodiments, the characteristic can be a real-time learned characteristic including but not limited to color, shape, edge, light reflectance, light illuminance, exposure, brightness, shadow, highlight, contrast, motion, depth, material, or combinations thereof. In some embodiments, a pre-learned feature also includes but is not limited to color, shape, edge, light reflectance, light illuminance, exposure, brightness, shadow, highlight, contrast, motion, depth, material or combinations thereof.

In some embodiments, knowledge learning can be performed with interactive user controls. For example, in a remote diagnosis session based on the methods/systems of the current disclosure, the doctor may request the system to look into the possibility whether a person has a certain type of disease or condition. In some embodiments, upon receiving such user directions, the system can group together relevant information that may be helpful for diagnosing the particular disease or condition.

In some embodiments, knowledge is derived from one type of information. In some embodiments, knowledge can be derived from multiple types of information. Most medical diagnoses take place at the knowledge level. Using the same example above, additional information, such as the maximum value of the fever, duration of the fever, exposure to heat and germs, or hydration state can lead to different diagnoses and varied treatments.

In some embodiments, information extraction can be performed based on machine learning and pattern recognition methods; e.g., deep learning, neural network, feature point based approaches, principal component analysis (PCA), linear discriminant analysis (LDA), etc.

In some embodiments, device 120 comprises an augmentation module 132. As disclosed herein, augmentation module 132 can generate real-time AR data by integrating the raw data, AR input data, information input, and knowledge input. In some embodiments, the integration takes place according to one or more criteria comprising a user preference, a system setting, an integration parameter, a characteristic of an object or a scene of the raw data, an interactive user control, or a combination thereof.

As disclosed herein, data augmentation can take place as many different levels. Information embodiments, data can be augmented based on one or more of information (real-time learned or existing), knowledge (real-time learned or existing), a user preference, a system setting, or additional input data. Here, data can include raw, processed, or other such as those pre-existing on a device, retrieved in real-time via network communication, or data created in real-time, combinations thereof.

In some embodiments, extracted object information is combined with augment reality (AR) input data to generate real-time AR data. As disclosed, the AR input data include virtual reality information or information that is processed from the data captured. In the case of image data, the combination process is also called image integration. In some embodiments, user device 120 comprises a separate argumentation module. For example, integration can occur on a pixel-by-pixel basis for both efficiency and accuracy.

In some embodiments, real-time extracted information can be used to generate the real-time AR data. In some embodiments, real-time learned knowledge can also be used to generate the real-time AR data. For example, in the example where the word "Hawaii" is emphasized during a friendly conversation about travel destination. The emphasis on "Hawaii" combined with facial expression and body movements allows the system to conclude that the user is excited about going to Hawaii. Such a conclusion (knowledge) promotes the system to create real-time AR data that include content relating to Hawaii.

In some embodiments, a user preference can define a particular type of AR input data that a user likes. For example, a person may choose to sit in a virtual quite tea house when conducting a business meeting, but relax on a beach when talking to families or friends. In some embodiments, the integration criteria are entirely defined automatically by the system based on the extracted real life object (e.g., the user) and the AR input data (e.g., a system-selected virtual environment).

In some embodiments, a user can provide real-time interactive control through voice or gesture input to re-define or modify the relations between the extracted real life object (e.g., the user) and AR input data (e.g., a virtual environment) during the integration process.

Additional exemplary methods of generating real-time AR data can be found in, for example, U.S. patent application Ser. No. 15/479,269 filed on Apr. 4, 2017 and entitled "Methods and Systems for Real-Time Image and Signal Processing in Augmented Reality based Communications;" U.S. patent application Ser. No. 15/479,277 filed on Apr. 4, 2017 and entitled "Real-Time and Context Based Advertisement with Augmented Reality Enhancement;" U.S. patent application Ser. No. 15/665,295 filed on Jul. 31, 2017 and entitled "Methods and Systems for Photorealistic Human Holographic Augmented Reality Communication with Interactive Control in Real-Time;" each of which is hereby incorporated by reference herein in its entirety.

In some embodiments, device 120 comprises a representation module 134, which can also be referred to as "data representation module 134" or "module 134." As disclosed herein, representation module 134 can represent one or more types of data using data parameters. For example, data parameters can include text, one or more codes, one or more numbers, one or more matrixes, one or more images, one or more audio signals, one or more sensor signals; or combinations thereof. For example, a particular AR input data (e.g., a specific virtual environment) can be represented with a numerical code. A user's expression can be represented as a series of numbers or matrixes. A user's gesture can be represented by gesture model parameters using a gesture model that is specific for the user.

As disclosed herein, different data parameters can be used to represent the same information. The specific form of the data parameters can be determined by a number of factors, including but not limited to culture background, language difference, personal habits, individual variations, and etc. For example, a typical first-time greeting in a user from the US can be represented by the word "Hello" or "Hi," followed up the phrase "nice to meet you" and a friendly wave to another user at a remote communication device. The same greeting for a user in the UK can include the phrase "how do you do?" and a friendly nod. Here, the data parameters representing the greetings include audio signals for the verbal greeting and images of the hand or head movement.

In some embodiments, significantly different data parameters may be used to represent AR data based on culture differences. For example, a user from the US communicates with a user from Japan in a formal business meeting using methods/systems according to the current disclosure. The user in Japan represents a traditional corporation, so the user in the US instructs the system to tailor the communication according to Japanese custom. Alternatively, the system can automatically establish settings to facilitate a formal meeting based on context and background information that is provided to the system. Here, the information: the word "Hello" or "Hi," the phrase "nice to meet you," the friendly wave, and optional background information can be used to derive data at the knowledge level; for example, the system can automatically learn about the context and purpose of the meeting. Subsequently, real-time AR data can be generated based on such information and knowledge. In the real-time AR data, the knowledge and information can be represented by data parameters that are different from those associated with the input data. For example, the system can use an avatar representing the user in the US to create an animation of the user greeting the Japanese user by bowing according to standard Japanese custom. Here, the real-time AR data significantly different from the raw data input: completely different form of data parameters are chosen to represent the same information and knowledge.

Representation module 134 can represent data at any level into proper format, including but not limited to including fully or partly augmented data, information data, knowledge data, AR input data, and etc. For example, augmented data can be separated into multiple files before being compressed for data transmission (e.g., steps 316-320 in FIG. 3 o steps 416-420 in FIG. 4). In some embodiments, representation module 134 can include data construction or reconstruction functions, which can change the data parameter form or type of a particular data, for example, to suit a particular type of hardware design (e.g., 3D display to 2D display or vice versa) or to present the data better to a particular audience (e.g., people with visual, audio and other forms of disabilities).

In some embodiments, device 120 comprises a compression module 136, which can also be referred to as "data compression module 136" or "module 136." As disclosed herein, data is compressed to achieve optimal compression rate while preserve the data integrity. Both lossless and lossy compression methods can be used for data compression, for example, as specified by the system or the user. Exemplary lossless methods include but are not limited to the Lempel-Ziv (LZ) method, Lempel-Ziv-Welch (LZW) method, LZX (an LZ77 family compression algorithm), Huffman encoding, grammar-based codes, probabilistic modeling, wavelet based method, and etc.

During lossy data compression, some loss of data is acceptable. Here, the data include raw data, information and even knowledge, depending on their respective relevance. Dropping nonessential detail from the data source can save storage space. Lossy data compression schemes are designed by research on how people perceive the data in question. For example, the human eye is more sensitive to subtle variations in luminance than it is to the variations in color. JPEG image compression works in part by rounding off nonessential bits of information. There is a corresponding trade-off between preserving information and reducing size. A number of popular compression formats exploit these perceptual differences, including those used in music files, images, and video.

In some embodiments, data type is used as a parameter during lossy data compression. In lossy audio compression, methods of psychoacoustics are used to remove non-audible (or less audible) components of the audio signal. Compression of human speech is often performed with even more specialized techniques; speech coding, or voice coding, is sometimes distinguished as a separate discipline from audio compression. Different audio and speech compression standards are listed under audio coding formats. Voice compression is used in internet telephony, for example, audio compression is used for CD ripping and is decoded by the audio players.

In some embodiments, regardless of data type, selective compression can be applied. For example, a selective compression approach can combines lossless and lossy data compression methods. Here, different methods of compression are applied to different bits of data in accordance with their respective significance. For data that need full reservation, a loss compression method will be applied, including for example, Lempel-Ziv (LZ) method, Lempel-Ziv-Welch (LZW) method, LZX (an LZ77 family compression algorithm), Huffman encoding, grammar-based codes, probabilistic modeling, wavelet based method, and etc. For example, when an iris scan is used a form of authentication, nearly all information will reside within the iris portion (color part of the eye) of the image. The data can be compressed such that integrity for the eyes is preserved while the remaining of the face or even the person can be significantly compressed. For example, anything beyond the face can even be completely removed. The combined approach allows key characteristics to be preserved in relevant data while reducing the burden of irrelevant data.

In some embodiments, compression module 136 can also perform de-compression of data at various levels, including fully or partly augmented data, information data, knowledge data, AR input data, and etc.

As disclosed herein, data (e.g., data or results of analysis) can be shared among raw data acquisition and processing module 126, extraction module 128, learning module 130, augmentation module 132, representation module 134, compression module 136, and any other functional modules not described here.

In some embodiments, pre-defined user preference and system settings can be applied to specify or limit the functionalities of any of the functional modules disclosed herein.

Additional details of these functional modules will be found in descriptions in connection with FIGS. 3-5.

In some embodiments, exemplary system 100 further comprises user device 140. In some embodiments, user device 140 can have the same functional modules as user device 120; e.g., user input and output module 142, local database 144, raw data acquisition and processing module 146, extraction module 148, learning module 150, augmentation module 152, representation module 154, compression module 156, and other functional modules. When a functional module is present, it can be implemented similarly as in user device 120 or according to any applicable known technology.

In some embodiments, user device 140 can have fewer functional modules and instead relies on a server 170 to provide one or more functionalities. As illustrated in FIG. 1C, other than data acquisition and processing module 146, the other functional modules, including extraction module 148, learning module 150, augmentation module 152, representation module 154, compression module 156, and etc. Effectively, these functionalities can be split between user device 140 and server 170 in any combination. For example, during a two way or multi-way communication process, user device 140 can transmit captured images to server 170 for processing (e.g., information extraction and knowledge learning). As disclosed herein, extraction and learning can take place on a server at a deeper and more advanced level because a server usually has more computer power and better access to different database, including, for example, a Big Data related database. In some embodiments, real-time AR data can be generated on server 170. In some embodiments, extracted information and learned knowledge can be transmitted back to user device 140 to be integrated with AR input data such as a virtual environment; for example, a user can choose to provide a customized virtual environment. Alternatively, user device 140 can transmit a selected virtual environment to server 170 before subsequent augmentation takes place on server 170. Although not depicted, it would be understood that any known input/output device or component, such as those disclosed in connection with user device 120 and user device 140, can be used by server 170.

As disclosed herein, the functionalities of extraction module 148, learning module 150, augmentation module 152, representation module 154, compression module 156 can be split between user device 140 and server 170. In some embodiments, some of the functionalities of data acquisition and processing module 146 can also take place on server 170.

In some embodiments, exemplary system 100 further comprises a server 170, Server 170 communicates with one or more user devices and include functional modules such as server database 174, raw data processing module 176 (which can perform a subset of functionalities of module 126 and module 146), extraction module 178, learning module 180, augmentation module 182, representation module 184, compression module 186, and other functional modules.

In some embodiments, raw data processing module 176 (which can perform a subset of functionalities of module 126 and module 146), extraction module 178, learning module 180, augmentation module 182, representation module 184, compression module 186 can perform functionalities that are similar to those disclosed herein in connection with user device 120 or user device 140. In some embodiments, these modules may perform the same functionalities at a deeper and more complete level on server 170 due to the server's enhanced computing power, large storage space and better access to database, when compared to a user device. For example, extraction, learning and augmentation can take place in parallel at a deeper and more complete level than a user device would allow.

In one aspect, disclosed herein are methods and systems for performing multi-directional real-time AR-based communication, in particular data augmentation, based on real-time extracted information and/or real-time learned knowledge.

Figure 2:
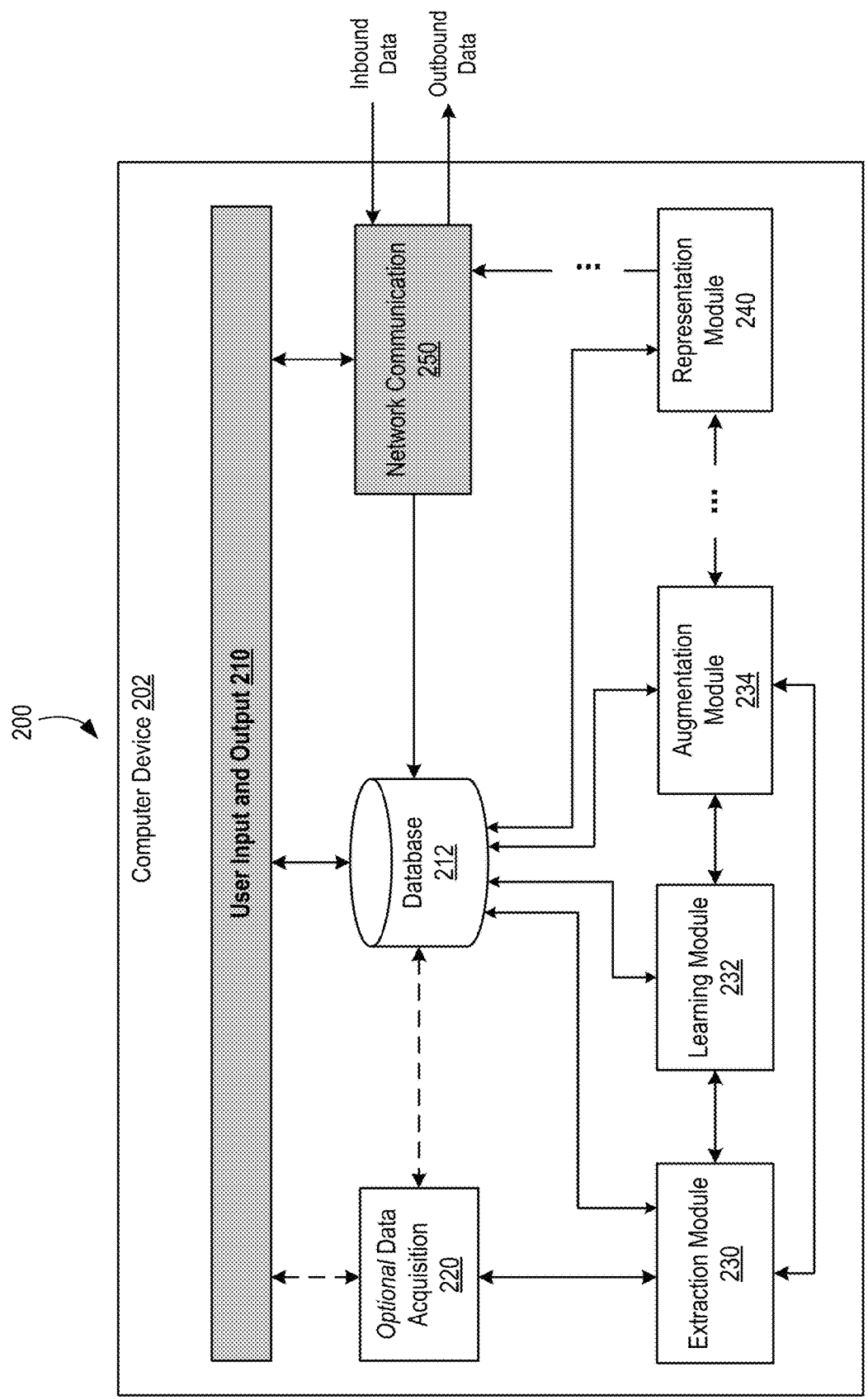
FIG. 2 depicts an example device for performing a bi-directional intelligent AR-based real-time communication.

FIG. 2 depicts an exemplary computer system capable of performing multi-directional real-time data processing and communication. The exemplary computer system is capable of processing both locally processed outbound data and inbound data from another device. Exemplary embodiment 200 achieve the functionalities by implementing, on computer device 202, user input and output (I/O) module 210, database 212, optional raw data acquisition module 220, extraction module 230, learning module 232, augmentation module 234, representation module 240, network communication module 250, and additional functional modules such as a data compression module, a data transmission module, and etc. As disclosed herein, the functionalities associated with computer device 202 can be the same or similar to those described in connection with FIG. 1C, including but not limited to device 120, device 140 or server 170.

In some embodiments, locally acquired data can be processed (e.g., using extraction module 230, learning module 232, augmentation module 234, and representation module 240) before they are transmitted to another device (e.g., another local device or a server) via network communication module 250.

In some embodiments, inbound data, for example, real-time AR data from another user device or a server can be received at device 202 via network communication module 250. The inbound data can be represented based on user preference and system setting of device 202. In some embodiments, further augmentation, information/knowledge reconstruction can be carries out by augmentation module 234, extraction module 230, and learning module 232 before the final AR-data can be presented to a user of device 202 via representation module 240.

As illustrated, computer device 202 can be a comprehensive communication platform that allows a user to process, analyze and manipulate both outbound and inbound data.

As disclosed herein, computer device 202 can be any applicable computer device such as a user device or an intelligent server. In some embodiments, functional modules such as extraction module 230, learning module 232, augmentation module 234, and representation module 240 are similar to or the same as the corresponding functional modules described in connection with user device 120 of FIG. 1C.

For a user device, user I/O module 210 can also be similar to or the same as the corresponding module described in connection with user device 120 of FIG. 1C. Importantly, user I/O module 210 comprises a display, a speaker, one or more sensor devices (such as thermal sensitive touch pad and etc.), in order to process inbound data and present them on the local device.

For an intelligent server, however, user I/O module 210 can be simpler because raw data acquisition from the user and final data representation to the user only take place locally and do not take place on a server. As such, many of the hardware components associated with these functionalities are not needed on a server device. Still, in some embodiments, user I/O module 210 of an intelligent server can also be similar to or the same as the I/O module for a user device. Optional data acquisition module may be implemented only on a user device.

In some embodiments, the systems and methods disclosed herein provide superior artificial intelligence based real-time learning at different levels (e.g., data, information and knowledge levels).

Advantageously, the systems and methods disclosed herein use real-time visual data (e.g., an image or a video) as input data, sometimes in combination with audio data or sensor data. Here, real-time visual data alone can supply a wealth of information, much more than audio data can, in contrast to Amazon Echo or Google Home. For example, real-time information such as body movement, facial expression, or gesture input, or combinations thereof can be determined from visual data. Such real-time information can lead to better real-time knowledge learning and subsequent correct actions. For example, instead of assigning complicated names to different lights, a user can simply point to a light. There is little room for error. In some embodiments, comprehensive real-time information from visual, audio and sensor data can be used to provide real-time interactive control of the communication by the user. For example, a user can change the content of the communication in real-time. In addition, a user can also provide real-time directions for one or more processing steps, for example, a user can request a certain type of information to be provided. Such request can include, e.g., calculating heart rates, identifying a breathing pattern, or visually displaying one or more types of data with embedded information and knowledge.

In some embodiments, other types of real-time data such as audio and sensor data are included to provide additional real-time information level of learning. For example, voice commands can be combined with gesture data to further enhance clarity. Often, different types of real-time data can provide complementary information. Advantageously, real-time information extraction and knowledge learning as disclosed herein can take place at a much more comprehensive and sophisticated level than what is currently known in the art.

Further, in some embodiments, the breadth or depth of real-time data made available according to the current systems and methods provide multi-layered, complementary, and fusible real-time data that can be subject to deep real-time learning by artificially intelligence at the information level, the knowledge level, or both. For example, visual data, audio data and sensor data can be combined to facilitate remote real-time medical diagnoses. Current systems/methods for remote medical diagnoses rely heavily on information provided by the patient. Indeed, most take place over the phone so very little data are collected. Through the use of visual data, audio data and sensor data, a doctor can gain a more comprehensive and accurate understanding at the information level, which in turn can lead to better and more sophisticated diagnoses that can be acted upon.

In some embodiments, existing information (e.g., information that is not obtained based on data captured in real-time according to the systems and methods disclosed herein) can also be used to facilitate real-time information learning and real-time knowledge learning.

As disclosed herein, network communication module 250 can establish communication between multiple devices, for example, user device 202 can communicate with multiple user devices. In some embodiments, user device 202 can communicate with a server and a user device simultaneously. Any type of communication protocol can be implemented, including wired or wireless network connection and local communication protocols such as those established via infrared and/or Bluetooth connection.

Exemplary Sender Embodiments

FIG. 3 depicts an exemplary embodiments for performing data processing on a computer device. Exemplary embodiment 300 comprises numerous steps for performing data acquisition/processing, information extraction, knowledge learning, data augmentation, data representation, data compression, data transmission and etc. Much of the steps here can be carried out by functional modules described in connection with FIGS. 1C and 2. Here, the computer device can be a local device or a server.

At step 302, image data and optional audio and sensor data are captured either individually or in combination. Exemplary data capture unit includes but is not limited to a microphone, a camera (e.g., 2D, 3D, IR, etc.), and one or more sensors. As disclosed herein, sensor devices collect data such as heartbeat, blood pressure, orientation, temperature, motion, altitude, pressure, proximity, acceleration, and etc. As disclosed herein, a sensor can record and store measurements of a user or of an environment where the sensor is located.

At steps 304, a visual data processing unit processes camera data for scene understanding and object detection, tracking, and recognition. For example, visual data include but are not limited to facial expression, hand gesture, body language tracking and recognition using 2D, 3D, 4D, color, near infrared (NIR) data, infrared IR data, thermal, multiple spectral, and/or hyperspectral images, or combinations thereof. This unit can also perform human identification based on face, gesture, body shape, palm, iris, sclera, etc. In some embodiments, text data can be included as visual data.

At step 306, an audio data processing unit processes microphone data from one or multiple microphones for audio data understanding, and/or audio noise mitigation. This unit can also perform human identification based on voice patterns. In some embodiments, certain audio data do not provide meaningful information and can be considered background noise. Such audio data can be treated as a scene.

At step 308, a sensor data processing unit processes sensor data for environmental understanding, user bio-status monitoring, and/or human behavior understanding.

In some embodiments, each functional data unit processes input data separately and individually. For example, multi-type data can be processed by two different unit simultaneously or sequentially. In some embodiments, one or more functional data unit can be combined into one.

At step 310, a data fusion unit fuses the audio data, visual data and sensor data together based on the user preference and system setting. During data fusion, multiple data sources are integrated to produce more consistent, accurate, and useful information than that provided by any individual data source. An example data fusion is to fuse the visual data and audio data together to analyze user emotion. In another example, the system can further fuse the visual data, audio data, and the sensor data (such as heart rate, blood pressure, etc.) to provide more accurate analyze of user emotion.

At step 312, information extracts necessary information from raw data or fused data based on one or more criteria, including, for example, a user preference, a system setting, an integration parameter, a characteristic of an object or a scene of the raw data, an interactive user control, or a combination thereof. In some embodiments, a criterion based on Big Data can also be used. For an example, the system can extract the user facial muscle movements that represent user expression information. For another example, the system can extract the user speech emphasize using the voice magnitude changes and tone changes. Optionally, at this step, extracted information (real-time learned or existing) can be used to create augmented reality data based on real-time data, AR input data, and additional data according to one or more criteria comprising a user preference, a system setting, a characteristic of the object or scene from the real-time data, or a combination thereof.

Also at step 312, previously obtained information can be further analyzed to determine knowledge. As described, knowledge learning from extracted information can be based on one or more criteria, including, for example, a user preference, a system setting, an integration parameter, a characteristic of an object or a scene of the raw data, an interactive user control, or a combination thereof. In some embodiments, a criterion based on Big Data can also be used.

At step 314, the knowledge, in combination with previously information, will be used to augment real-time data (processed or raw), AR input data (314-1), and additional data to create real-time AR data, according to one or more criteria, including, for example, a user preference, a system setting, an integration parameter, a characteristic of an object or a scene of the raw data, an interactive user control, or a combination thereof. In some embodiments, a criterion based on Big Data can also be used. In some embodiments, only knowledge will be used for the augmentation. In some embodiments, only information will be used for the augmentation.

As disclosed herein, any suitable data can be used as AR input data (314-1). For example, they can be real-time data or pre-created data. AR input data (314-1) can be realistic or include virtual elements.

In some embodiments, prior to data augmentation, some data can be eliminated or added. For example, data related to user privacy can be eliminated. Certain data can be eliminate for better compression results. Alternatively, extra data can be add to create a certain effect (e.g., appearing cool, fun, mysterious, friendly, serious and etc.) Data can also be added to facilitate better conversation engagement. As disclosed herein, data can be eliminated or added any reasons based on a user preference, system setting, characteristics of the object/scene, information, knowledge, and/or interactive user control. For example, the knowledge/information based augmentation unit would eliminate the background scene from the camera data and use user selected background scene to replace the real background information for privacy protection reason. In another example, the augmentation unit may remove user face and body while using preselected avatar to represent user but copy the user's facial mussel movement, eye movement, gesture, body movement, and etc. into the avatar for fun. In still another example, the information augmentation unit may remove the user's true voice information but keeping user's speech tone and magnitude change along with the speech content for better conversation engagement. In yet another example, the knowledge/information based augmentation unit would perform real-time deformation of user face/body/voice/background scene, etc.

Besides the above examples, one important function of the augmentation unit is: it can extract a real-time information in one form and transform it into another type of information for display, audio, and/or sensor control. For example, one unit can extract the user's heartbeat change and use it as a control signal for some sensors in another unit, or display it as a person's height in the virtual world.

At step 316, a data representation unit uses data to present the real-time AR data from step 314. As an example, a user's expression may be represented as a series of numbers/matrix which represent expression model parameters. In another example, if the user chooses to augment the scene background, the background scene can be the scene number in the system. In still another example, a gesture of a user can be represented by parameters using a gesture model of the user. In yet another example, user identity can be represented by use ID number after the system identification. In some embodiments, the augmented data can be separated into multiple files to prepare for subsequent actions (such as data compression and transmission). For example, the video/audio portion of the real-time AR data can be presented as a mpeg file with both video and audio signals. Alternatively, the video/audio portion of the real-time AR data can represented in separate video and audio files. Similarly sensor related data can be represented in a separate file.

At step 318, a data compression unit compresses the data to achieve optimal compression rate while preserve the data integrity. Both lossless or lossy compression methods can be used for data compression based on the design needs, such as Lempel-Ziv (LZ) method, Lempel-Ziv-Welch (LZW) method, LZX (an LZ77 family compression algorithm), Huffman encoding, grammar-based codes, probabilistic modeling, wavelet based method, and etc. During lossy data compression, some loss of data is acceptable. Here, the data include raw data, information and even knowledge, depending on their respective relevance. Dropping nonessential detail from the data source can save storage space. In some embodiments, a selective compression approach can be used by combining lossless and lossy data compression methods. Here, different methods of compression are applied to different bits of data in accordance with their respective significance. For data that need full reservation, a loss compression method will be applied, including for example, Lempel-Ziv (LZ) method, Lempel-Ziv-Welch (LZW) method, LZX (an LZ77 family compression algorithm), Huffman encoding, grammar-based codes, probabilistic modeling, wavelet based method, and etc. For example, when an iris scan is used a form of authentication, nearly all information will reside within images of the user's eyes. The data can be compressed such that integrity for the eyes is preserved while the remaining of the face or even the person can be significantly compressed. For example, anything beyond the face can even be completely removed. The combined approach allows key characteristics to be preserved in relevant data while reducing the burden of irrelevant data. At step 320, compressed data can be transferred to a proper receiver device and the cloud using proper communication protocols, using, for example, a data transmission unit. In some embodiments, the data can also be encrypted to ensure secure transformation.

As disclosed herein, each of the steps can itself be an iterative process including many round of analysis or processing. As such, many of the steps can be carried in real-time concurrently in parallel processes. For example, processing of visual, audio and sensor data (e.g., steps 304, 306, and 308) can take place at the same time. Also, for example, as soon as some information is extracted at 312-1, knowledge learning at 312-2 can be started while continuously receiving additional information that is be concurrently extracted.

In some embodiments, all aspects of data processing can take place in one device via a secure processor and a secure channel, with secured storage including encryption to ensure data security. In some embodiments, part of the data processing can take place via a secure processor, secure channel, with secure storage including encryption to ensure security while other parts of the processing can take place via a processor, channel and storage with regular security level. In some embodiments, all aspects of the data processing can take place via a processor, channel and storage with regular security level. As disclosed herein, data processing includes processing of raw data, information, knowledge, and beyond.

Exemplary Server Embodiments

FIG. 4 depicts an exemplary embodiments for performing data processing on a computer device. Exemplary embodiment 400 comprises numerous steps for performing data processing, information extraction, knowledge learning, data augmentation, data representation, data compression, data transmission and etc. Much of the steps here can be carried out by functional modules described in connection with FIGS. 1C and 2. Here, the computer device can also be a local device or a server, preferably a server.

At step 402, the computer device (e.g., a server) receives data from another device (e.g., a user device). As disclosed herein, data received comprise raw data, partially processed data, fully processed data (including augmented data), or combinations thereof. Exemplary embodiment 400 illustrates a scenario where data received at the computer device has already been augmented on a different device. In some embodiments, the received data are decompressed (e.g., the previously augmented data) into proper format suitable for processing on the server. If the data is encrypted for secure transfer, in this unit, the data will be decrypted. The decompression can be performed by a compression module (for example, elements 136, 156 or 186 of FIG. 1C).

At step 404, data received is saved in a database on the computer device (e.g., a server). Also saved on the server data is big data information, which can be used to facilitate in-depth information extraction and deep knowledge learning.

At step 406, existing information/knowledge in the received data can be unpackaged. For example, expression model parameters can be transformed into the expression information. In another example, a background number can also be transformed to selected background scene, e.g., previously selected by a user of the device sending the data. In some embodiments, gesture model parameters can be transformed into hand and arm positions and shapes, and vice versa. As disclosed, the functions at this step can be performed by a representation module (e.g., element 134, 154, 184 or 240 from FIGS. 1C and 2.)

At step 408, unpackaged existing information/knowledge associated with the audio, video, sensor data from the previous step can be reconstructed with one or more data parameters, which often involves one or more types of transformation. For example, user facial expression information, gesture information, and body movement information can be reconstructed along with user's audio information and user's sensor information together. In some embodiments, the reconstructed data can be included in intensive intelligence understanding, for example, at step 412.

At step 410, Big Data material can be accessed for subsequent processing. In some embodiments, Big Data material can be retrieved in real-time. In some embodiments, Big Data material can be saved in a database on the computer device. In some embodiments, the received data from steps 402 and 404 can also be saved in the database. In some embodiments, the received data and Big Data material can be used in subsequent processing; e.g., for in-depth information extraction and knowledge learning.

At step 412, more intensive intelligence understanding based on the constructed information/knowledge, received data, and Big Data can be carried out according to one or more user preferences and/or system settings. Here, more complete and in-depth intelligence understanding can be made possible by leveraging the availability of Big Data and high computation power of a device such as a server. Here, new information can be extracted based on existing information from the previous augmented data at step 412-1. Similarly, at step 412-2, new knowledge can be learned based on existing knowledge associated with the previous augmented data. For example, for an intelligent communication application, an intelligence information digestion unit (e.g., implemented as elements 128, 130, 148, 150, 178, 180 of FIG. 1C or elements 230 and 232 of FIG. 2) can determine the user intent, the user's emotion status (happy, sad, pain, normal, etc.), or the user's behavior status (normal, abnormal, etc.). In another example, for a remote medical diagnosis application, the intelligence information digestion unit can have in-depth analyze of the user health status based on the current information and past information and other health information in healthy and diseased populations. In yet another example, for an international business communication application, the unit can provide intelligence information to mitigate the culture difference: e.g., if a Japanese user avoids eye contact during the communication, the unit can provide the non-Japanese user that this is a sign of respect in Japanese culture to avoid eye contact. At the same time, the system can provide the Japanese user that it is American culture to have eye-contact during communication. In still another example, the system automatically alerts a user if improper language has been used during the business meeting that may be perceived offensive under the particular culture settings for another user included in the communication. As a form of remedy or mitigation, the system can allow the user or another user (e.g., a supervisor having superior control rights over the communication) to stop transmission of the offensive content.

In some embodiments, the intelligence information digestion unit can also perform automatic language translation and behavior translation. For example, it can automatically translate English into Chinese, and vice versa. It can also automatically translate an American user's "hi" into a behavior such as a "bow" for a Japanese user, while translating a Japanese user's bow into a "hi" or other form of greetings. In multi-party group communication, the same language or behavior can be translated into different forms based on the culture background of other participants of the communication.

At step 414, an knowledge/information based augmentation unit (e.g., implemented as elements 132, 152, 182 of FIG. 1C or element 234 of FIG. 2) can augment the received data and additional AR input data (e.g., 414-1) by applying the information and knowledge learned from step 412. Here, augmentation of data can also be performed by leveraging the availability of Big Data and high computation power of a device such as a server. In some embodiments, step 414 applies machine learning and pattern recognition methods to perform intelligent data augmentation. For example, after transforming the American user's Hi into a "bow" in previous step, the augmentation unit would augment the gesture, body movement and user's expressions to perform the "bow," for example, using an avatar representing the American user. For example, during augmentation, a 3D model of the user can be built and used a 3D scene of the user bowing in greeting.

At step 416, a data representation unit translates the augmented information data into data parameters representing different types of data (e.g., text, numbers, matrixes, images, signals, etc.). As disclosed herein, the data representation unit can be implemented as, for example, elements 134, 154, and 184 of FIG. 1C and element 240 of FIG. 2.

At step 418, a data compression unit compresses the transformed data to achieve optimal compression rate while preserve the data integrity and etc. As disclosed herein, the data compression unit can be implemented as elements 136, 156 and 186 of FIG. 1C.

At step 420, a data transmission unit transfers the compressed data to one or more proper receiver units using proper communication protocols. In some embodiments, the compressed data can be transferred to back to the sender device. The data transfer unit can also encrypt the data for secure transmission needs. Although not illustrated previously, one would understand that a data transmission unit can be implemented on either a user device or a server, utilizing the functionalities of, for example, network communication module 250 of FIG. 2.

As disclosed herein, each of the steps can itself be an iterative process including many round of analysis or processing. As such, many of the steps can be carried in real-time concurrently in parallel processes. For example, saving data (e.g., step 404), accessing Big Data (e.g., step 410) and unpacking of the received data (e.g., step 406) can take place at the same time. Also, for example, as soon as some information is extracted at 412-1, knowledge learning at 412-2 can be started while continuously receiving additional information that is be concurrently extracted.

In some embodiments, all aspects of data processing can take place in one device via a secure processor and a secure channel, with secured storage including encryption to ensure data security. In some embodiments, part of the data processing can take place via a secure processor, secure channel, with secure storage including encryption to ensure security while other parts of the processing can take place via a processor, channel and storage with regular security level. In some embodiments, all aspects of the data processing can take place via a processor, channel and storage with regular security level. As disclosed herein, data processing includes processing of raw data, information, knowledge, and beyond.

Exemplary Receiver Embodiments

FIG. 5 depicts an exemplary embodiments for performing data processing on a computer device. Exemplary embodiment 500 comprises numerous steps for performing data processing, information extraction, knowledge learning, data augmentation, data representation, data compression, data transmission and etc. Much of the steps here can be carried out by functional modules described in connection with FIGS. 1C and 2. Here, the computer device can also be a local device or a server, preferably a server.

At step 504, data are received at the computer device from another device (e.g., a user device or an intelligence server). In some embodiments, the received data can be decompressed into one or more proper formats based on the confirmation of the receiver device. If the data are encrypted for secure transfer, the data can be decrypted at this step.

At step 506, the received data (e.g., decompressed/decrypted) can be translated into proper information based on one or more user preferences and system settings. For example, if the computer device does not have 3D display capability, at this step 3D information can be properly transformed into 2D displayable information. In another example, the function of the computer device can be limited such that the bulk of the processing, analysis and manipulation take place on another device (such as a server). This is suitable when, a user prefers a local device having light capability. Functions performed at this step enable the system to adapt to the specific hardware unit that the user is using. In some embodiments, the computer device here can be a receiver device, forming a full communication cycle with a sender device (e.g., FIG. 3) and a server device (e.g., FIGS. 3 and 4).

At step 508, data can be further augmented based on the receiver's preference, receiver device's setting, the characteristics of object/scene on the receiving side, the receiver's interactive control. For example, in a remote medical communication session, the sender is a doctor, and the receiver is a child. The child expresses and understands his health level as the happiness level of his favorite toy bear. The happier the bear is, the healthier he is. The system can augment the health level evaluated by the doctor into the happiness of his toy bear on his hand. For example, a screen can show a happy bear after a healthy routine check-up and offer a bear with a soothing voice to offer comfort when the child suffers from an unpleasant condition such as fever, pain, cough and etc.

At step 510, the method can decide on the format and device by which the augmented information can be presented. For example, this system can decide to use display to present all image related information and use speaker to present all audio related information for a blind person. For another example, the system may reconstruct all audio signals into visual signals for a deaf person. In some embodiments, the functionalities here can also be performed by a representation module. In some embodiments, the reconstruction function can be implemented at the previous augmentation step.

At step 512, reconstructed information and knowledge can be translated into proper data with proper format.

At step 514, visual data can be transformed into proper format and delivered to; for example, a monitor or screen for display. At step 516, audio data can be transformed into proper audio format and delivered to, for example, a speaker.

At step 518, sensor data can be transformed into proper control signals and delivered to corresponding sensors. For example, vibration signals can be delivered and cause one or more motors associated with the computer device to vibrate. For another example, the unit transfers the motion control signal can be delivered and cause one or more devices that are associated with the computer device to move.

As disclosed herein, each of the steps can itself be an iterative process including many round of analysis or processing. As such, many of the steps can be carried in real-time concurrently in parallel processes. For example, data un-package and delivery at steps 514 through 518 can take place at the same time. In fact, in some embodiments, the delivery of the data must be coordinated in timing to create certain desired effects. For example, the visual and audio data of a person saying Hi should take place at the same time when a handshake sensation is delivered. Also, for example, as soon as some data has been augmented at step 508, data reconstruction and/or data representation at steps 510 and 512 can be started while continuously receiving additional data from step 508.

In some embodiments, all aspects of data processing can take place in one device via a secure processor and a secure channel, with secured storage including encryption to ensure data security. In some embodiments, part of the data processing can take place via a secure processor, secure channel, with secure storage including encryption to ensure security while other parts of the processing can take place via a processor, channel and storage with regular security level. In some embodiments, all aspects of the data processing can take place via a processor, channel and storage with regular security level. As disclosed herein, data processing includes processing of raw data, information, knowledge, and beyond.

Example System Architecture

Figure 6:
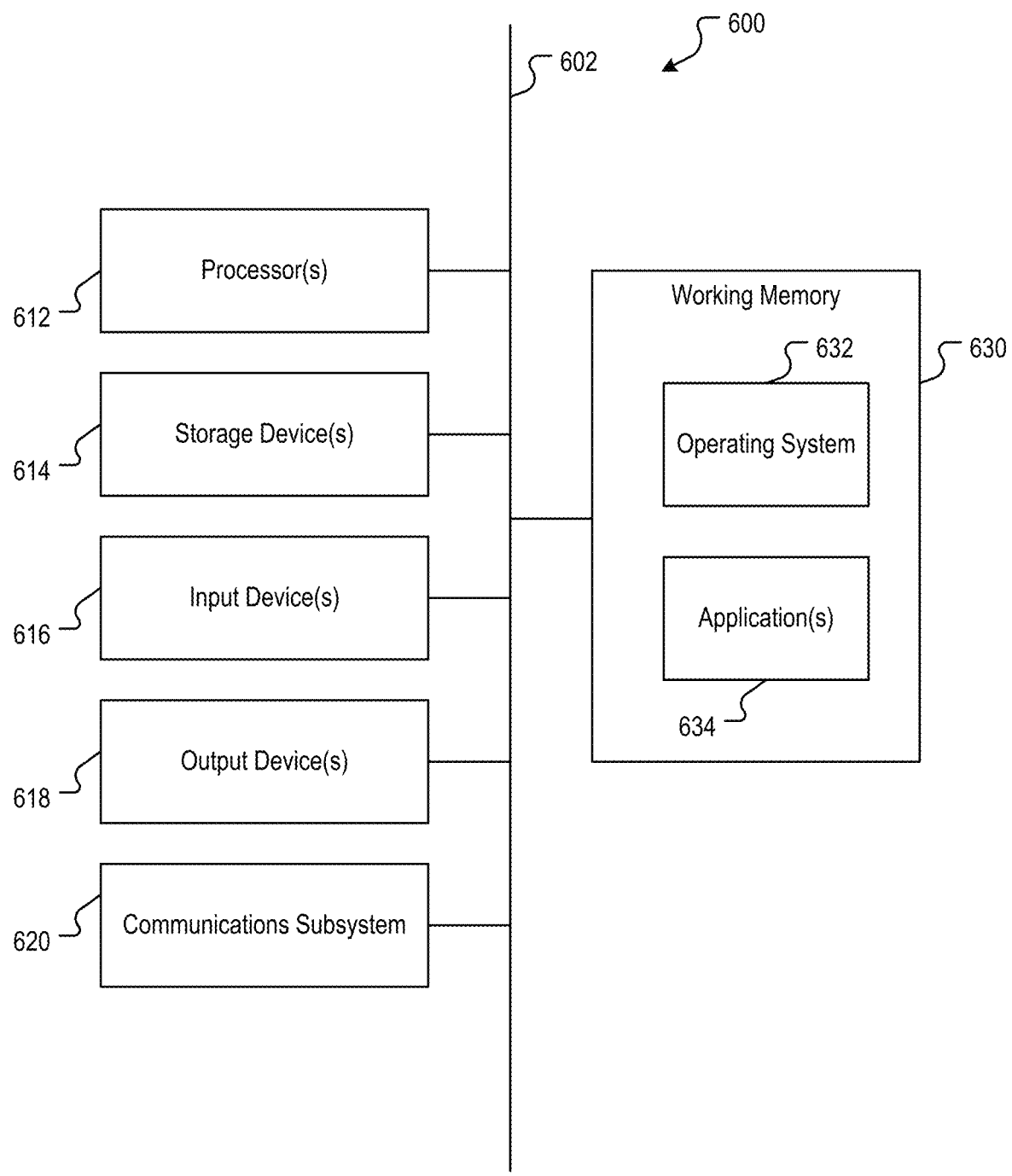
FIG. 6 depicts a diagram of an example system architecture for implementing the features and processes of FIGS. 1-5.

FIG. 6 depicts a diagram of an example system architecture for implementing the features and processes of FIGS. 1-5.

In one aspect, some embodiments can employ a computer system (such as the computer system 600) to perform methods in accordance with various embodiments of the invention. An exemplary embodiment of computer system 600, includes a bus 602, one or more processors 612, one or more storage devices 614, at least an input device 616, at least an output device 618, a communication subsystem 620, working memory 630 which includes an operating system 632, device drivers, executable libraries, and/or other code, such as one or more application(s) 634.

According to a set of embodiments, some or all of the procedures of such methods are performed by the computer system 600 in response to processor 612 executing one or more sequences of one or more instructions (which might be incorporated into operating system 632 and/or other code, such as an application program 634) contained in working memory 630. Such instructions can be read into the working memory 630 from another computer-readable medium, such as one or more of storage device(s) 614. Merely by way of example, execution of the sequences of instructions contained in working memory 630 might cause processor(s) 612 to perform one or more procedures of the methods described herein. Additionally or alternatively, portions of the methods described herein can be executed through specialized hardware. Merely by way of example, a portion of one or more procedures described with respect to the method(s) discussed above, such as method 200, method 240, method 280, and methods illustrated in FIGS. 3-5, might be implemented by processor 612. In some instances, processor 612 can be an example of real-time learning module 130 of user device 120. In some examples, application program 634 can be an example of an application performing the iterative real-time learning method depicted in FIG. 2B.

In some embodiments, computer system 600 can further include (and/or be in communication with) one or more non-transitory storage devices 614, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices can be configured to implement any appropriate data stores, including without limitation, various file systems, database structures, and/or the like. In some embodiments, storage device 614 can be example of local database 124 of user device 120, local database 144 of user device 140, or server database 174 of server 170.

In some embodiments, computer system 600 can further include one or more input devices 616, which can comprise, without limitation, any input device that allows a computer device (e.g., user device 120 or 140) to receive information from a user, from another computer device, from the environment of the computer device, or from a functional component communicably connected with the computer device. Examples of input devices include but are not limited to a camera, a microphone, or a sensor. Exemplary camera devices include but are not limited to a network-enabled camera, a depth camera, a set of cameras, a 2D, 3D or 4D camera, a color camera, a gray scale camera, a regular RGB camera, an infrared (IR) camera, a near infrared (NIR) camera, a thermal camera, a multiple spectrum camera, a hyperspectral camera, a 360 degree camera etc. A microphone can be any device that is capable of detecting and capturing audio signals. A sensor can be any component, module, or subsystem that can detect events or changes in its environment and send the signals to another device (e.g., a computer processor). Exemplary signals include but are not limited to those associated with heartbeat, blood pressure, orientation, temperature, motion, altitude, pressure, proximity, acceleration, and etc.

In some embodiments, computer system 600 can further include one or more input output devices 618, which can comprise, without limitation, any output device that can receive information from a computer device (e.g., user device 120 or 140) and communicate such information to a user, to another computer device, to the environment of the computer device, or to a functional component communicably connected with the computer device. Examples of input devices include but are not limited to a display, a speaker, a printer, a light, a sensor device, and etc. A sensor device can receive and exhibit data in forms that can result in sensory perception by a user. Such forms include but are not limited to heat, light, touch, pressure, motion, and etc.

It would be understood that any applicable input/output devices or components, such as those disclosed in connection with user device 120, user device 140, or server 170, can be applied to input device 616 and output device 618.

In some embodiments, computer system 600 might also include a communications subsystem 620, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. Communications subsystem 620 can include one or more input and/or output communication interfaces to permit data to be exchanged with a network, other computer systems, and/or any other electrical devices/peripherals. In many embodiments, computer system 600 will further comprise a working memory 630, which can include a RAM or ROM device, as described above.

In some embodiments, computer system 600 also can comprise software elements, shown as being currently located within the working memory 630, including an operating system 632, device drivers, executable libraries, and/or other code, such as one or more application(s) 634, which can comprise computer programs provided by various embodiments, and/or can be designed to implement methods, and/or configure systems, provided by other embodiments, as described herein. Merely by way of example, a portion of one or more procedures described with respect to the method(s) discussed above, such as the methods described in relation to FIGS. 2-5, can be implemented as code and/or instructions executable by a computer (and/or a processing unit within a computer); in an aspect, then, such code and/or instructions can be used to configure. In some embodiment, a general purpose computer (or other device) can be adapted to perform one or more operations in accordance with the described methods. In some instances, working memory can 630 can be an example of the memory of user device 120 or 140.

A set of these instructions and/or code might be stored on a non-transitory computer-readable storage medium, such as storage device(s) 614 described above. In some cases, the storage medium might be incorporated within a computer system, such as computer system 600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by computer system 600 and/or might take the form of source and/or installable code, which, upon compilation and/or installation on the computer system 600 (e.g., using any of a variety of generally available compilers, installation programs, compression/decompression utilities, etc.), then takes the form of executable code. In some instances, storage device(s) 630 can be an example of the memory of user device 120 or 140.

It will be apparent to those skilled in the art that substantial variations can be made in accordance with specific requirements. For example, customized hardware might also be used, and/or particular elements might be implemented in hardware, software (including portable software, such as applets, etc.), or both. Further, connection to other computing devices such as network input/output devices can be employed.

The terms "machine-readable medium" and "computer-readable medium," as used herein, refer to any medium that participates in providing data that causes a machine to operate in a specific fashion. In an embodiment implemented using computer system 600, various computer-readable media might be involved in providing instructions/code to processor(s) 612 for execution and/or might be used to store and/or carry such instructions/code. In many implementations, a computer-readable medium is a physical and/or tangible storage medium. Such a medium can take the form of a non-volatile media or volatile media. Non-volatile media include, for example, optical and/or magnetic disks, such as storage device(s) 614. Volatile media include, without limitation, dynamic memory, such as working memory 630.

Common forms of physical and/or tangible computer-readable media include, for example, a floppy disk, a flexible disk, hard disk, magnetic tape, flash disk, flash drive, or any other magnetic medium, a CD-ROM, any other optical medium, any other physical medium with patterns of holes, a RAM, a PROM, EPROM, a FLASH-EPROM, any other memory chip or cartridge, or any other medium from which a computer can read instructions and/or code.

Various forms of computer-readable media can be involved in carrying one or more sequences of one or more instructions to processor(s) 612 for execution. Merely by way of example, the instructions can initially be carried on a magnetic disk and/or optical disc of a remote computer. A remote computer might load the instructions into its dynamic memory and send the instructions as signals over a transmission medium to be received and/or executed by computer system 600.

Communications subsystem 620 (and/or components thereof) generally will receive signals, and bus 602 then might carry the signals (and/or the data, instructions, etc. that are carried by the signals) to working memory 630, from which processor(s) 612 retrieves and executes the instructions. The instructions received by working memory 630 can optionally be stored on non-transitory storage device 614 either before or after execution by processor(s) 612.

Exemplary Embodiments of Applications

Examples of possible application of the methods/systems of the current disclosure are provided. As disclosed herein, all methods steps and processes take place in real-time unless otherwise specifies.

Video Conferencing

The methods and systems of the current disclosure can be used to conduct video conferences with augmented reality. The following are examples of features that can be made available using the current methods/systems.

In some embodiments, a user can select standard background offered by the methods/systems or specify a personally prepared background. For example, a user can choose to replace a real background with a virtual one such as a stationary image (e.g., using an image of a professional office to replace a real messy hotel bedroom view captured by the camera), a video (e.g., using a pre-recorded video as the background to replace the actual background), or a real-time video from another camera (e.g., using the surveillance camera view of Time Square to replace the current user background).

In some embodiments, users can choose to augment their own physical appearances during the video conference. For example, users can make themselves look thinker/fatter, shorter/taller, change their skin color (e.g., to depict more tan or remove obvious defects in the skin such as dark visible warts or birthmark), adding accessories (e.g., adding earrings, hats, necklace, glasses, tattoo, putting on virtual makeup, and etc.).

In some embodiments, users can each choose an avatar to represent themselves and let the avatar to copy their expressions, body movements, and/or gestures.

In some embodiments, users can augment their voices to make them sound better, have fun, or hide their identities.

In some embodiments, users can make them appeared in the same virtual space with a remote party while they are communicating with one another remotely.

In some embodiments, the systems/methods can also allow users at the same physical space to appear remotely through an intelligent augment reality (IAR) based communication system.

In some embodiments, a user can choose to appear with another person or object that is not part of her actual environment. The other person or object is not part of the communication, and can be a real life person or object captured previously or concurrently on camera. For example, a person can choose to appear with a video of her favorite pop singer idle. The video can be a pre-recorded footage or a concurrently broadcasted video of a live concert.

In some embodiments, methods/systems can perform real-time monitoring of the communication content and can provide alert to the users if some culture/social improper content (such as gesture, words, etc.) is detected and let users to decide whether to retract the communication content. In the meantime, the system sends a pause signal to remote users to halt communication.

In some embodiments, the methods/system can provide just one-side communication, for the entertainment of the user him- or herself or for advertisement applications. There is no remote party in another side of the communication.

In some embodiments, the methods/systems can provide automatic language translation to help users with different languages to communicate with one another.

In some embodiments, the methods/systems can provide real-time analysis and provides the intelligence of the user expression, intent and culture implication during the communication.

In some embodiments, the methods/systems can provide real-time intelligence and explanation of some special terms that require expertise in a certain field to understand. Additionally, the system can also provide real-time intelligence, explanation and background of specific culture background to the users to make the communication more effective.

Real-Time Interactive Controls

In some embodiments, the current methods/systems can be used to provide marketing and ecommerce information to the users during the communication.

For example, a user can click on the dresses/accessory/background objects of the video screen during the communication and the system provides price information and real-time merchandise recommendation information to the user about the similar products or related products.

In some embodiments, the methods/systems can be used to provide virtual reality experience to the users for travel, trying new products, training skill, experiencing new things, showcasing new real-estate (offices, homes, buildings, shopping malls, and etc.), explore new equipment design, touring new facility, and attending classes, and etc.

In some embodiments, the methods/systems can be used for users to express emotions and love with augmented reality. For example, users can send their love with heart rate data, breath patterns, and temperature changes to others with augmented sensor control. Such as they can use heart rate increase to control the light color change in other sides of the communication. They can use breath pattern changes to cause one or more motors associated with a remote communication unit to vibrate. Temperature changes can be used to control the sound changes of the other side of the communication system.

In some embodiments, the methods/systems can be used to augment remote sex and help improve the sex experience. For example, the system can use gestures, body movements, and biological responses to control sex toys, devices, equipment, and images of the others.

In another example, the methods/systems can use users' bio-status, expressions, voices, behaviors, etc. according to one or more user preferences and system settings to provide augmented sex with light, audio, vibration, sex toys, images, videos, etc.

Remote Medical Services

In one aspect, methods and systems disclosed herein can be used for real-time remote medical services.

In some embodiments, a patient can use the system to provide bio-status to a medical service provider from the comfort of their home, while hiding the background to have more privacy. In some embodiments, a medical service provider (e.g., a doctor or a nurse) can also work from home with augmented reality to hide background to get more privacy and maintain a professional appearance.

In some embodiments, the methods/systems can provide better visualization and data presentation of the patient's current bio-status data along with the patient's past health information. The system can provide intelligent digest of the patient's current bio-status and past health information to provide the service provider a more personized and holistic view of the user's health situation to help the service provider to provide better customized medical service.

In some embodiments, the methods/systems can also use the patient's bio-status information (such as heart rate, breath pattern, temperature, etc.) to control some remote sensors (such as alarm, lights, vibration, audio, video, etc.) to alert remote medical service providers of any abnormal health situation associated with the user.

In some embodiments, the methods/systems can also translate a doctor's commands, gestures, body movements into one or more sensor controls for the patients' side to help control the sensors (such as heart rate monitor, temperature monitoring, and/or some medical devices controls).

In some embodiments, the system can also provide real-time translation for medical terms to the patient to help the patient to have better understanding.

Remote Education and Training

In one aspect, methods and systems disclosed herein can be used to provide remote education and training.

Education providers (e.g., professors, teachers, lecturers, teaching assistants, and etc.) can use the system to deliver augmented education content to users. For example, for teaching human anatomy, the system can overlay human anatomy with a student's real body in the scene to help students to relate the anatomy information with their own body. The students can get more interested and be more motivated to work on the subject. This can also help the education providers to explain the content more vividly and make it easier for students to understand.

In some embodiments, the methods/systems can also be used to help students to collaborate on projects and participate in class discussions remotely but they can appear to work at the same virtual classroom to facilitate better collaboration and learning experience.

In some embodiments, the methods/systems can help the students to explore space, unknown places easier by provide immersive AR environment.

In some embodiments, the methods/systems can also help to better train students, professionals, troops with intelligent AR data to provide immersive and interactive training environment.

Communication with Internet of Things (IoTs)

The methods and systems disclosed herein can be used for smart home, smart office, smart building, smart vehicle, smart space station, etc.

In some embodiments, the methods/systems can represent the user data (e.g., expression, behavior, body movement, gestures, and bio-status) into other forms, such as sensor control signals. These control signals can be received by IoTs (internet of things) for real-time controls for a smart home, a smart office, a smart building, and a smart vehicle.

For example, the bio-status of a user can be re-presented and intelligently analyzed to understand the user's environmental needs and these needs are then translated into augmented information to control conditions (e.g., room temperatures, light condition, humidity, and etc.) of the user's home, office, building, space station, etc.

In another example, the system can control a smart vehicle based on the user's gestures, body movement and/or commands remotely.

In some embodiments, the methods/systems can be used for users to try clothes, and accessories. The AR capability of the system lets the users to try clothes and accessories virtually before they buy them.

In some embodiments, the methods/systems can be used for users to practice sports. The AR capability of the system lets the users practice sports and records their motions for users to study/analyze and learn. The intelligence of the system can also provide users the guidelines to how to better practice sports actions.

In some embodiments, the methods/systems can be used as a game counsel for the users for gaming.

In some embodiments, the methods/systems can be used for the users to use their commands, body movements, gestures, bio-status, etc. to control remote machines, space shuttles, space controllers, ships, underwater machines, unmanned vehicles, unmanned aviation vehicles and send them control signals, etc. The remote side of the communication unit can be connected with local/remote machines, space shuttles, space controllers, ships, underwater machines, unmanned vehicles, unmanned aviation vehicles and send them control signals. The methods/systems can represent and augment the users' commands, body movements, gestures, bio-status, and etc. to be control signals.

Additional Communication Examples

The methods and systems disclosed herein can be used to communicate with animals, plants, and aliens interactively and intelligently. For example, the methods/systems can learn the language, behaviors, and expressions of animals, plants, and possibly aliens using Big Data, science principles using machine learning and pattern recognition methods; e.g., deep learning, principal component analysis (PCA), linear discriminant analysis (LDA), and etc.

In some embodiments, the methods/systems can also learn the relationship between human language, behaviors, and expressions and those of animals, plants and possibly aliens.

During the communication, the methods/systems can translate human language, behaviors, and expressions into language, behaviors, and expressions for animals, plants and possibly aliens, and vice versa.

In some embodiments, the methods/systems can be used by one group of humans, animals, plants, and possibly aliens to communicate with another group (or multiple groups) of humans/animals/plants/aliens with AR and intelligence-based analysis.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

I claim:

1. A method for providing real-time augmented reality (AR) data, the method comprising:
   receiving, in real-time at a computer device, a stream of visual data:
   generating the real-time AR data by integrating the stream of received visual data, AR input data, information input, and knowledge input, based on one or more criteria comprising a user preference, a system setting, an integration parameter, a characteristic of an object or a scene of the stream of visual data, an interactive user control, or a combination thereof, wherein:
      the information input comprises a real time extracted portion of the stream of visual data, extracted in real-time as the stream of visual data is being received, at a plurality of time points based on one or more criteria comprising a user preference, a system setting, an integration parameter, a characteristic of an object or a scene of the stream of visual data, an interactive user control, or a combination thereof;
      the knowledge input is learned cumulatively based on the information extracted from the visual data at the plurality of time points and a user's behavior learned from the real-time extracted portion of the visual data;
      the real-time AR data comprise information data corresponding to the information input, the received visual data, and knowledge data corresponding to the knowledge input: and
   representing at least a portion of the information data or knowledge data of the real-time AR data, including replacing a background image data by AR data based on the information data or knowledge data, with a plurality sets of data parameters, wherein each set of data parameters comprises text, one or more codes, one or more numbers, one or more matrixes, one or more images, one or more audio signals, one or more sensor signals: or combinations thereof, wherein said representing comprising making a personalized decision based on the learned knowledge input.

2. The method of claim 1, further comprising:
   removing unwanted data from the stream of visual data or a variant thereof, the unwanted data comprising unwanted environment scene data, data that are determined to be irrelevant based on one or more criteria comprising a user preference, a system setting, a characteristic of an object or scene from the stream of visual data, selected data from which information has been extracted, selected information from which knowledge has been learned, or a combination thereof.

3. The method of claim 1, wherein the at least one set of data parameters representing the at least a portion of the information data or the knowledge data is of a different type from the data parameters in the stream of visual data that correspond to the information input or the knowledge input.

4. The method of claim 1, wherein the one or more criteria for extracting the information input further comprises at least one criterion based on big data.

5. The method of claim 1, wherein the knowledge input is learned based on the information extracted at the plurality of time points based on one or more criteria comprising a user preference, a system setting, a characteristic of an object or scene from the stream of visual data, an integration parameter, an interactive user control, at least one criterion based on big data, or a combination thereof.

6. The method of claim 1, further comprising:
selectively compressing at least a portion of the real-time AR data.

7. The method of claim 1, wherein the stream of visual data is received at the computer device from another computer device.

8. The method of claim 7, wherein, the receiving step further comprises:
receiving, in real-time at the computer device, existing AR-data from the other computer device, the existing AR-data comprising existing information data and existing knowledge data.

9. The method of claim 8, wherein the existing information data and existing knowledge data are used to integrate the stream of visual data to render a reconstructed variant of the stream of visual data.

10. The method of claim 9, further comprising:
extracting the information input based on the reconstructed variant of the stream of visual data at the plurality of time points based on one or more criteria comprising a user preference, a system setting, at least one criterion based on big data, the existing information data, or a combination thereof.

11. A system for providing real-time augmented reality (AR) data, the system comprising:
one or more processors: and
a nontransitory computer readable medium, the nontransitory computer-readable medium including one or more sequences of instructions that, when executed by the one or more processors, cause the one or more processors to perform operations comprising:
receiving, in real-time at a computer device, a stream of visual data:
generating the real-time AR data by integrating the stream of received visual data, AR input data, information input, and knowledge input, based on one or more criteria comprising a user preference, a system setting, an integration parameter, a characteristic of an object or a scene of the stream of visual data, an interactive user control, or a combination thereof, wherein:
the information input is extracted in real-time from the stream of visual data at a plurality of time points based on one or more criteria comprising a user preference, a system setting, an integration parameter, a characteristic of an object or a scene of the stream of visual data, an interactive user control, or a combination thereof,
the knowledge input is learned cumulatively based on the information extracted from the visual data at the plurality of time points and a user's behavior learned from the real-time extracted portion of the visual data, and
the real-time AR data comprise information data corresponding to the information input, the received visual data, and knowledge data corresponding to the knowledge input: and
representing at least a portion of the information data or knowledge data of the real-time AR data, including replacing a background image data by AR data based on the information data or knowledge data, with a plurality sets of data parameters, wherein each set of data parameters comprises text, one or more codes, one or more numbers, one or more matrixes, one or more images, one or more audio signals, one or more sensor signals: or combinations thereof, wherein said representing comprising making a personalized decision based on the learned knowledge input.

12. The system of claim 11, further comprising:
a data input and output component comprises a microphone, a camera or video capturing device, a display, a sensor, or a combination thereof.

13. The system of claim 12, wherein the camera or video capturing device comprises a 2D camera, a 3D camera, a 4D camera, a color camera, a near infrared camera, an infrared camera, a thermal camera, a multi-spectra camera, a hyperspectral camera, or a combination thereof.

14. The system of claim 11, wherein the at least one set of data parameters representing the at least a portion of the information data or the knowledge data is of a different type from the data parameters in the stream of visual data that correspond to the information input or the knowledge input.

15. The system of claim 11, wherein the one or more criteria for extracting the information input further comprises at least one criterion based on big data.

16. The system of claim 11, wherein the operations further comprise:
selectively compressing at least a portion of the real-time AR data.

17. The system of claim 11, wherein the stream of visual data is received at the computer device from another computer device.

18. A non-transitory computer-readable medium including one or more sequences of instructions that, when executed by one or more processors, cause the processors to perform operations comprising:
receiving, in real-time at a computer device, a stream of visual data:
generating the real-time AR data by integrating the stream of received visual data, AR input data, information input, and knowledge input, based on one or more criteria comprising a user preference, a system setting, an integration parameter, a characteristic of an object or a scene of the stream of visual data, an interactive user control, or a combination thereof, wherein:
the information input comprises a real time extracted portion of the stream of visual data, extracted in real-time as the stream of visual data is being received, at a plurality of time points based on one or more criteria comprising a user preference, a system setting, an integration parameter, a characteristic of an object or a scene of the stream of visual data, an interactive user control, or a combination thereof, the knowledge input is learned cumulatively based on the information extracted from the visual data at the plurality of time points and a user's behavior learned from the real-time extracted portion of the visual data, the real-time AR data comprise information data corresponding to the information input, the received visual data, and knowledge data corresponding to the knowledge input: and representing at least a portion of the information data or knowledge data of the real-time AR data, including replacing a background image data by AR data based on the information data or knowledge data, with a plurality sets of data parameters, wherein each set of data parameters comprises text, one or more codes, one or more numbers, one or more matrixes, one or more images, one or more audio signals, one or more sensor signals, or combinations thereof, wherein said representing comprising making a personalized decision based on the learned knowledge input.

19. The non-transitory computer-readable medium of claim 18, further comprising:

removing unwanted data from the stream of visual data or a variant thereof, the unwanted data comprising unwanted environment scene data, data that are determined to be irrelevant based on one or more criteria comprising a user preference, a system setting, a characteristic of an object or scene from the stream of visual data, selected data from which information has been extracted, selected information from which knowledge has been learned, or a combination thereof.

20. The non-transitory computer-readable medium of claim 18, wherein the at least one set of data parameters representing the at least a portion of the information data or the knowledge data is of a different type from the data parameters in the stream of visual data that correspond to the information input or the knowledge input.

21. The non-transitory computer-readable medium of claim 18, wherein the one or more criteria for extracting the information input further comprises at least one criterion based on big data.

22. The non-transitory computer-readable medium of claim 18, wherein the knowledge input is learned based on information extracted at multiple time points based on one or more criteria comprising a user preference, a system setting, a characteristic of an object or scene from the stream of visual data, an integration parameter, an interactive user control, at least one criterion based on big data, or a combination thereof.

23. The non-transitory computer-readable medium of claim 18, further comprising:

selectively compressing at least a portion of the real-time AR data.

24. The non-transitory computer-readable medium of claim 18, wherein the stream of visual data is received at the computer device from another computer device.

25. The non-transitory computer-readable medium of claim 24, wherein, the receiving step further comprises:

receiving, in real-time at the computer device, existing AR-data from the other computer device, the existing AR-data comprising existing information data and existing knowledge data.

26. The method of claim 25, wherein the existing information data and existing knowledge data are used to integrate the stream of visual data to render a reconstructed variant of the stream of visual data.

27. The method of claim 26, further comprising:

extracting the information input based on the reconstructed variant of the stream of visual data at the one or more time points based on one or more criteria comprising a user preference, a system setting, at least one criterion based on big data, the existing information data, or a combination thereof.

* * * * *